US008477684B2

(12) United States Patent
Khandekar et al.

(10) Patent No.: US 8,477,684 B2
(45) Date of Patent: Jul. 2, 2013

(54) ACKNOWLEDGEMENT OF CONTROL MESSAGES IN A WIRELESS COMMUNICATION SYSTEM

(75) Inventors: Aamod Khandekar, San Diego, CA (US); Alexei Gorokhov, San Diego, CA (US); Avneesh Agrawal, San Diego, CA (US); Sundeep Rangan, Jersey City, NJ (US); Arnab Das, Summit, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 473 days.

(21) Appl. No.: 11/943,551

(22) Filed: Nov. 20, 2007

(65) Prior Publication Data

US 2008/0151829 A1    Jun. 26, 2008

Related U.S. Application Data

(63) Continuation-in-part of application No. 11/260,931, filed on Oct. 27, 2005.

(60) Provisional application No. 60/868,464, filed on Dec. 4, 2006.

(51) Int. Cl.
*H04W 4/00* (2009.01)

(52) U.S. Cl.
USPC .......................................................... 370/328

(58) Field of Classification Search
USPC .......................................... 370/328, 329, 335
See application file for complete search history.

(56) References Cited

U.S. PATENT DOCUMENTS

| 4,393,276 A | 7/1983 | Steele |
| 4,554,668 A | 11/1985 | Deman et al. |
| 4,747,137 A | 5/1988 | Matsunaga |
| 4,783,779 A | 11/1988 | Takahata et al. |
| 4,783,780 A | 11/1988 | Alexis |

(Continued)

FOREIGN PATENT DOCUMENTS

| CA | 2348137 | 11/2001 |
| CA | 2477536 | 9/2003 |

(Continued)

OTHER PUBLICATIONS

Favre et al: "Self-Adaptive Transmission Procedure" IBM Technical Disclosure Bulletin, IBM Corporation, Sep. 1976, vol. 19, No. 4, pp. 1283-1284, New York, New York.

(Continued)

*Primary Examiner* — Nathan Mitchell
(74) *Attorney, Agent, or Firm* — Donald C. Kordich

(57) ABSTRACT

Techniques for sending control messages are described. In an aspect, assignment messages may be acknowledged based on either linked or dedicated acknowledgement (ACK) resources. A terminal may receive an assignment message from a base station, determine whether to acknowledge the assignment message, and determine ACK resources to use to acknowledge the assignment message. The ACK resources may be linked to a control block on which the assignment message was received, linked to resources given by the assignment message, or assigned to the terminal. The terminal may send the acknowledgement on the ACK resources. In another aspect, a control message may be acknowledged based on ACK resources determined based on the control message or the control block. The ACK resources may be linked to resources assigned by the control message or linked to the control message. The terminal may send an acknowledgement for the control message on the ACK resources.

44 Claims, 10 Drawing Sheets

U.S. PATENT DOCUMENTS

| | | | |
|---|---|---|---|
| 4,975,952 A | 12/1990 | Mabey et al. | |
| 5,008,900 A | 4/1991 | Critchlow et al. | |
| 5,115,248 A | 5/1992 | Roederer | |
| 5,268,694 A | 12/1993 | Jan et al. | |
| 5,282,222 A | 1/1994 | Fattouche et al. | |
| 5,363,408 A | 11/1994 | Paik et al. | |
| 5,371,761 A | 12/1994 | Daffara et al. | |
| 5,384,810 A | 1/1995 | Amrany | |
| 5,406,551 A | 4/1995 | Saito et al. | |
| 5,410,538 A | 4/1995 | Roche et al. | |
| 5,455,839 A | 10/1995 | Eyuboglu | |
| 5,465,253 A | 11/1995 | Rahnema | |
| 5,491,727 A | 2/1996 | Petit | |
| 5,513,379 A | 4/1996 | Benveniste et al. | |
| 5,539,748 A | 7/1996 | Raith | |
| 5,548,582 A | 8/1996 | Brajal et al. | |
| 5,583,869 A | 12/1996 | Grube et al. | |
| 5,594,738 A | 1/1997 | Crisler et al. | |
| 5,604,744 A | 2/1997 | Andersson et al. | |
| 5,612,978 A | 3/1997 | Blanchard et al. | |
| 5,625,876 A | 4/1997 | Gilhousen et al. | |
| 5,684,491 A | 11/1997 | Newman et al. | |
| 5,726,978 A | 3/1998 | Frodigh et al. | |
| 5,732,113 A | 3/1998 | Schmidl et al. | |
| 5,745,487 A * | 4/1998 | Hamaki | 370/352 |
| 5,768,276 A | 6/1998 | Diachina et al. | |
| 5,790,537 A | 8/1998 | Yoon et al. | |
| 5,812,938 A | 9/1998 | Gilhousen et al. | |
| 5,815,488 A | 9/1998 | Williams et al. | |
| 5,822,368 A | 10/1998 | Wang | |
| 5,838,268 A | 11/1998 | Frenkel | |
| 5,867,478 A | 2/1999 | Baum et al. | |
| 5,870,393 A | 2/1999 | Yano et al. | |
| 5,887,023 A | 3/1999 | Mabuchi | |
| 5,907,585 A | 5/1999 | Suzuki et al. | |
| 5,920,571 A | 7/1999 | Houck et al. | |
| 5,926,470 A | 7/1999 | Tiedemann, Jr. | |
| 5,933,421 A | 8/1999 | Alamouti et al. | |
| 5,949,814 A | 9/1999 | Odenwalder et al. | |
| 5,953,325 A | 9/1999 | Willars | |
| 5,955,992 A | 9/1999 | Shattil | |
| 5,956,642 A | 9/1999 | Larsson et al. | |
| 5,995,992 A | 11/1999 | Eckard | |
| 5,999,826 A | 12/1999 | Whinnett | |
| 6,002,942 A | 12/1999 | Park | |
| 6,016,123 A | 1/2000 | Barton et al. | |
| 6,038,263 A | 3/2000 | Kotzin et al. | |
| 6,038,450 A | 3/2000 | Brink et al. | |
| 6,052,364 A | 4/2000 | Chalmers et al. | |
| 6,061,337 A | 5/2000 | Light et al. | |
| 6,067,315 A | 5/2000 | Sandin | |
| 6,075,350 A | 6/2000 | Peng | |
| 6,075,797 A | 6/2000 | Thomas | |
| 6,076,114 A | 6/2000 | Wesley | |
| 6,088,345 A | 7/2000 | Sakoda et al. | |
| 6,108,323 A | 8/2000 | Gray | |
| 6,108,550 A | 8/2000 | Wiorek et al. | |
| 6,112,094 A | 8/2000 | Dent | |
| 6,128,776 A | 10/2000 | Kang | |
| 6,138,037 A | 10/2000 | Jaamies | |
| 6,141,317 A | 10/2000 | Marchok et al. | |
| 6,154,484 A | 11/2000 | Lee et al. | |
| 6,169,910 B1 | 1/2001 | Tamil et al. | |
| 6,175,550 B1 | 1/2001 | Van Nee | |
| 6,175,650 B1 | 1/2001 | Sindhu et al. | |
| 6,176,550 B1 | 1/2001 | Lamart et al. | |
| 6,198,775 B1 | 3/2001 | Khayrallah et al. | |
| 6,215,983 B1 | 4/2001 | Dogan et al. | |
| 6,226,280 B1 | 5/2001 | Roark et al. | |
| 6,232,918 B1 | 5/2001 | Wax et al. | |
| 6,240,129 B1 | 5/2001 | Reusens et al. | |
| 6,249,683 B1 | 6/2001 | Lundby et al. | |
| 6,256,478 B1 | 7/2001 | Allen et al. | |
| 6,271,946 B1 | 8/2001 | Chang et al. | |
| 6,272,122 B1 | 8/2001 | Wee | |
| 6,310,704 B1 | 10/2001 | Dogan et al. | |
| 6,317,435 B1 | 11/2001 | Tiedemann, Jr. et al. | |
| 6,335,922 B1 | 1/2002 | Tiedemann, Jr. et al. | |
| 6,337,659 B1 | 1/2002 | Kim | |
| 6,337,983 B1 | 1/2002 | Bonta et al. | |
| 6,353,637 B1 | 3/2002 | Mansour et al. | |
| 6,363,060 B1 | 3/2002 | Sarkar | |
| 6,374,115 B1 | 4/2002 | Barnes et al. | |
| 6,377,539 B1 | 4/2002 | Kang et al. | |
| 6,377,809 B1 | 4/2002 | Rezaiifar et al. | |
| 6,388,998 B1 | 5/2002 | Kasturia | |
| 6,393,008 B1 | 5/2002 | Cheng et al. | |
| 6,393,012 B1 | 5/2002 | Pankaj | |
| 6,401,062 B1 | 6/2002 | Murashima | |
| 6,438,369 B1 | 8/2002 | Huang et al. | |
| 6,449,246 B1 | 9/2002 | Barton et al. | |
| 6,466,800 B1 | 10/2002 | Sydon et al. | |
| 6,473,467 B1 | 10/2002 | Wallace et al. | |
| 6,477,317 B1 | 11/2002 | Itokawa | |
| 6,478,422 B1 | 11/2002 | Hansen | |
| 6,483,820 B1 | 11/2002 | Davidson et al. | |
| 6,487,243 B1 | 11/2002 | Hwang et al. | |
| 6,496,790 B1 | 12/2002 | Kathavate et al. | |
| 6,501,810 B1 | 12/2002 | Karim et al. | |
| 6,507,601 B2 | 1/2003 | Parsa et al. | |
| 6,519,462 B1 | 2/2003 | Lu et al. | |
| 6,529,525 B1 * | 3/2003 | Pecen et al. | 370/469 |
| 6,535,666 B1 | 3/2003 | Dogan et al. | |
| 6,539,008 B1 | 3/2003 | Ahn et al. | |
| 6,539,213 B1 | 3/2003 | Richards et al. | |
| 6,542,485 B1 | 4/2003 | Mujtaba | |
| 6,542,743 B1 | 4/2003 | Soliman | |
| 6,563,806 B1 | 5/2003 | Yano et al. | |
| 6,563,881 B1 | 5/2003 | Sakoda et al. | |
| 6,577,739 B1 | 6/2003 | Hurtig et al. | |
| 6,584,140 B1 | 6/2003 | Lee | |
| 6,590,881 B1 | 7/2003 | Wallace et al. | |
| 6,597,746 B1 | 7/2003 | Amrany et al. | |
| 6,601,206 B1 | 7/2003 | Marvasti | |
| 6,614,857 B1 | 9/2003 | Buehrer et al. | |
| 6,625,172 B2 | 9/2003 | Odenwalder et al. | |
| 6,636,568 B2 | 10/2003 | Kadous | |
| 6,654,339 B1 | 11/2003 | Bohnke et al. | |
| 6,654,431 B1 | 11/2003 | Barton et al. | |
| 6,657,949 B1 | 12/2003 | Jones, IV et al. | |
| 6,658,258 B1 | 12/2003 | Chen et al. | |
| 6,674,787 B1 | 1/2004 | Dick et al. | |
| 6,674,810 B1 | 1/2004 | Cheng | |
| 6,675,012 B2 | 1/2004 | Gray | |
| 6,678,318 B1 | 1/2004 | Lai | |
| 6,690,951 B1 | 2/2004 | Cuffaro et al. | |
| 6,693,952 B1 | 2/2004 | Chuah et al. | |
| 6,701,165 B1 | 3/2004 | Ho et al. | |
| 6,704,571 B1 | 3/2004 | Moon | |
| 6,711,400 B1 | 3/2004 | Aura | |
| 6,717,908 B2 | 4/2004 | Zehavi et al. | |
| 6,721,568 B1 | 4/2004 | Gustavsson et al. | |
| 6,724,719 B1 | 4/2004 | Tong et al. | |
| 6,731,602 B1 | 5/2004 | Watanabe et al. | |
| 6,735,244 B1 | 5/2004 | Hasegawa et al. | |
| 6,744,743 B2 | 6/2004 | Walton et al. | |
| 6,748,220 B1 | 6/2004 | Chow et al. | |
| 6,751,444 B1 | 6/2004 | Meiyappan | |
| 6,751,456 B2 | 6/2004 | Bilgic | |
| 6,754,511 B1 | 6/2004 | Halford et al. | |
| 6,763,009 B1 | 7/2004 | Bedekar et al. | |
| 6,765,969 B1 | 7/2004 | Vook et al. | |
| 6,776,165 B2 | 8/2004 | Jin | |
| 6,776,765 B2 | 8/2004 | Soukup et al. | |
| 6,778,513 B2 | 8/2004 | Kasapi et al. | |
| 6,785,341 B2 | 8/2004 | Walton et al. | |
| 6,798,736 B1 | 9/2004 | Black et al. | |
| 6,799,043 B2 | 9/2004 | Tiedemann, Jr. et al. | |
| 6,802,035 B2 | 10/2004 | Catreux et al. | |
| 6,813,284 B2 | 11/2004 | Vayanos et al. | |
| 6,821,535 B2 | 11/2004 | Nurmi et al. | |
| 6,828,293 B1 | 12/2004 | Hazenkamp et al. | |
| 6,829,293 B2 | 12/2004 | Jones et al. | |
| 6,831,943 B1 | 12/2004 | Dabak et al. | |
| 6,842,487 B1 | 1/2005 | Larsson | |
| 6,850,481 B2 | 2/2005 | Wu et al. | |
| 6,850,509 B2 | 2/2005 | Lee et al. | |

| Patent | Kind | Date | Inventors |
|---|---|---|---|
| 6,862,271 | B2 | 3/2005 | Medvedev et al. |
| 6,870,808 | B1 | 3/2005 | Liu et al. |
| 6,870,826 | B1 | 3/2005 | Ishizu |
| 6,904,097 | B2 | 6/2005 | Agami et al. |
| 6,904,283 | B2 | 6/2005 | Li et al. |
| 6,904,550 | B2 | 6/2005 | Sibecas et al. |
| 6,907,020 | B2 | 6/2005 | Periyalwar et al. |
| 6,907,269 | B2 | 6/2005 | Yamaguchi et al. |
| 6,909,707 | B2 | 6/2005 | Rotstein et al. |
| 6,917,602 | B2 | 7/2005 | Toskala et al. |
| 6,917,821 | B2 | 7/2005 | Kadous et al. |
| 6,927,728 | B2 | 8/2005 | Vook et al. |
| 6,928,047 | B1 | 8/2005 | Xia |
| 6,934,266 | B2 | 8/2005 | Dulin et al. |
| 6,934,275 | B1 | 8/2005 | Love et al. |
| 6,934,340 | B1 | 8/2005 | Dollard |
| 6,940,827 | B2 | 9/2005 | Li et al. |
| 6,940,842 | B2 | 9/2005 | Proctor, Jr. |
| 6,940,845 | B2 | 9/2005 | Benveniste |
| 6,954,481 | B1 | 10/2005 | Laroia et al. |
| 6,954,622 | B2 | 10/2005 | Nelson et al. |
| 6,961,364 | B1 | 11/2005 | Laroia et al. |
| 6,963,543 | B2 | 11/2005 | Diep et al. |
| 6,970,682 | B2 | 11/2005 | Crilly, Jr. et al. |
| 6,975,868 | B2 | 12/2005 | Joshi et al. |
| 6,980,540 | B1 | 12/2005 | Laroia et al. |
| 6,985,434 | B2 | 1/2006 | Wu et al. |
| 6,985,453 | B2 | 1/2006 | Lundby et al. |
| 6,985,466 | B1 | 1/2006 | Yun et al. |
| 6,985,498 | B2 | 1/2006 | Laroia et al. |
| 6,987,746 | B1 | 1/2006 | Song |
| 6,993,342 | B2 | 1/2006 | Kuchibhotla et al. |
| 7,002,900 | B2 | 2/2006 | Walton et al. |
| 7,006,529 | B2 | 2/2006 | Alastalo et al. |
| 7,006,557 | B2 | 2/2006 | Subrahmanya et al. |
| 7,006,848 | B2 | 2/2006 | Ling et al. |
| 7,009,500 | B2 | 3/2006 | Rao et al. |
| 7,010,048 | B1 | 3/2006 | Shattil |
| 7,013,143 | B2 | 3/2006 | Love et al. |
| 7,016,318 | B2 | 3/2006 | Pankaj et al. |
| 7,016,319 | B2 | 3/2006 | Baum et al. |
| 7,016,425 | B1 | 3/2006 | Kraiem |
| 7,020,110 | B2 | 3/2006 | Walton et al. |
| 7,023,880 | B2 | 4/2006 | El-Maleh et al. |
| 7,039,356 | B2 | 5/2006 | Nguyen |
| 7,039,370 | B2 | 5/2006 | Laroia et al. |
| 7,042,857 | B2 | 5/2006 | Krishnan et al. |
| 7,047,006 | B2 | 5/2006 | Classon et al. |
| 7,050,402 | B2 | 5/2006 | Schmidl et al. |
| 7,050,405 | B2 | 5/2006 | Attar et al. |
| 7,050,759 | B2 | 5/2006 | Gaal et al. |
| 7,054,301 | B1 | 5/2006 | Sousa et al. |
| 7,061,898 | B2 | 6/2006 | Hashem et al. |
| 7,069,009 | B2 | 6/2006 | Li et al. |
| 7,072,315 | B1 | 7/2006 | Liu et al. |
| 7,079,867 | B2 | 7/2006 | Chun et al. |
| 7,085,574 | B2 | 8/2006 | Gaal et al. |
| 7,095,708 | B1 | 8/2006 | Alamouti et al. |
| 7,099,299 | B2 | 8/2006 | Liang et al. |
| 7,099,630 | B2 | 8/2006 | Brunner et al. |
| 7,103,384 | B2 | 9/2006 | Chun |
| 7,106,319 | B2 | 9/2006 | Ishiyama |
| 7,113,808 | B2 | 9/2006 | Hwang et al. |
| 7,120,134 | B2 | 10/2006 | Tiedemann, Jr. et al. |
| 7,120,395 | B2 | 10/2006 | Tong et al. |
| 7,131,086 | B2 | 10/2006 | Yamasaki et al. |
| 7,133,460 | B2 | 11/2006 | Bae et al. |
| 7,139,328 | B2 | 11/2006 | Thomas et al. |
| 7,145,940 | B2 | 12/2006 | Gore et al. |
| 7,145,959 | B2 | 12/2006 | Harel et al. |
| 7,149,199 | B2 | 12/2006 | Sung et al. |
| 7,149,238 | B2 | 12/2006 | Agee et al. |
| 7,151,761 | B1 | 12/2006 | Palenius |
| 7,151,936 | B2 | 12/2006 | Wager et al. |
| 7,154,936 | B2 | 12/2006 | Bjerke et al. |
| 7,155,236 | B2 | 12/2006 | Chen et al. |
| 7,157,351 | B2 | 1/2007 | Cheng et al. |
| 7,161,971 | B2 | 1/2007 | Tiedemann, Jr. et al. |
| 7,164,649 | B2 | 1/2007 | Walton et al. |
| 7,164,696 | B2 | 1/2007 | Sano et al. |
| 7,167,916 | B2 | 1/2007 | Willen et al. |
| 7,170,937 | B2 | 1/2007 | Zhou |
| 7,177,297 | B2 | 2/2007 | Agrawal et al. |
| 7,177,351 | B2 | 2/2007 | Kadous |
| 7,180,627 | B2 | 2/2007 | Moylan et al. |
| 7,181,170 | B2 | 2/2007 | Love et al. |
| 7,184,426 | B2 | 2/2007 | Padovani et al. |
| 7,188,300 | B2 | 3/2007 | Eriksson et al. |
| 7,197,282 | B2 | 3/2007 | Dent et al. |
| 7,200,177 | B2 | 4/2007 | Miyoshi |
| 7,209,712 | B2 | 4/2007 | Holtzman |
| 7,215,979 | B2 | 5/2007 | Nakagawa et al. |
| 7,230,942 | B2 | 6/2007 | Laroia et al. |
| 7,233,634 | B1 | 6/2007 | Hassell Sweatman et al. |
| 7,236,747 | B1 | 6/2007 | Meacham et al. |
| 7,242,722 | B2 | 7/2007 | Krauss et al. |
| 7,243,150 | B2 | 7/2007 | Sher et al. |
| 7,248,559 | B2 | 7/2007 | Ma et al. |
| 7,248,841 | B2 | 7/2007 | Agee et al. |
| 7,254,158 | B2 | 8/2007 | Agrawal |
| 7,257,167 | B2 | 8/2007 | Lau |
| 7,257,406 | B2 | 8/2007 | Ji |
| 7,257,423 | B2 | 8/2007 | Iochi |
| 7,260,153 | B2 | 8/2007 | Nissani et al. |
| 7,280,467 | B2 | 10/2007 | Smee et al. |
| 7,289,570 | B2 | 10/2007 | Schmidl et al. |
| 7,289,585 | B2 | 10/2007 | Sandhu et al. |
| 7,290,195 | B2 | 10/2007 | Guo et al. |
| 7,292,651 | B2 | 11/2007 | Li |
| 7,292,863 | B2 | 11/2007 | Chen et al. |
| 7,295,509 | B2 | 11/2007 | Laroia et al. |
| 7,313,086 | B2 | 12/2007 | Aizawa |
| 7,313,126 | B2 | 12/2007 | Yun et al. |
| 7,313,174 | B2 | 12/2007 | Alard et al. |
| 7,313,407 | B2 | 12/2007 | Shapira |
| 7,327,812 | B2 | 2/2008 | Auer |
| 7,330,701 | B2 | 2/2008 | Mukkavilli et al. |
| 7,336,727 | B2 | 2/2008 | Mukkavilli et al. |
| 7,349,371 | B2 | 3/2008 | Schein et al. |
| 7,349,667 | B2 | 3/2008 | Magee et al. |
| 7,356,000 | B2 | 4/2008 | Oprescu-Surcobe et al. |
| 7,356,005 | B2 | 4/2008 | Derryberry et al. |
| 7,356,073 | B2 | 4/2008 | Heikkila |
| 7,359,327 | B2 | 4/2008 | Oshiba |
| 7,363,055 | B2 | 4/2008 | Castrogiovanni et al. |
| 7,366,223 | B1 | 4/2008 | Chen et al. |
| 7,366,253 | B2 | 4/2008 | Kim et al. |
| 7,366,520 | B2 | 4/2008 | Haustein et al. |
| 7,369,531 | B2 | 5/2008 | Cho et al. |
| 7,372,911 | B1 | 5/2008 | Lindskog et al. |
| 7,372,912 | B2 | 5/2008 | Seo et al. |
| 7,379,489 | B2 | 5/2008 | Zuniga et al. |
| 7,382,764 | B2 | 6/2008 | Uehara |
| 7,392,014 | B2 | 6/2008 | Baker et al. |
| 7,394,865 | B2 | 7/2008 | Borran et al. |
| 7,403,745 | B2 | 7/2008 | Dominique et al. |
| 7,403,748 | B1 | 7/2008 | Keskitalo et al. |
| 7,406,119 | B2 | 7/2008 | Yamano et al. |
| 7,406,336 | B2 | 7/2008 | Astely et al. |
| 7,411,898 | B2 | 8/2008 | Erlich et al. |
| 7,412,212 | B2 | 8/2008 | Hottinen |
| 7,418,043 | B2 | 8/2008 | Shattil |
| 7,418,246 | B2 | 8/2008 | Kim et al. |
| 7,423,991 | B2 | 9/2008 | Cho et al. |
| 7,426,426 | B2 | 9/2008 | Van Baren |
| 7,428,426 | B2 | 9/2008 | Kiran et al. |
| 7,433,661 | B2 | 10/2008 | Kogiantis et al. |
| 7,437,164 | B2 | 10/2008 | Agrawal et al. |
| 7,443,835 | B2 | 10/2008 | Lakshmi Narayanan et al. |
| 7,447,270 | B1 | 11/2008 | Hottinen |
| 7,450,548 | B2 | 11/2008 | Haustein et al. |
| 7,460,466 | B2 | 12/2008 | Lee et al. |
| 7,463,698 | B2 | 12/2008 | Fujii et al. |
| 7,468,943 | B2 | 12/2008 | Gu et al. |
| 7,469,011 | B2 | 12/2008 | Lin et al. |
| 7,471,963 | B2 | 12/2008 | Kim et al. |
| 7,483,408 | B2 | 1/2009 | Bevan et al. |
| 7,483,719 | B2 | 1/2009 | Kim et al. |

| Patent/Pub No. | Date | Name |
|---|---|---|
| 7,486,735 B2 | 2/2009 | Dubuc et al. |
| 7,492,788 B2 * | 2/2009 | Zhang et al. .................. 370/468 |
| 7,499,393 B2 | 3/2009 | Ozluturk |
| 7,508,748 B2 | 3/2009 | Kadous |
| 7,508,842 B2 | 3/2009 | Baum et al. |
| 7,512,096 B2 | 3/2009 | Kuzminskiy et al. |
| 7,548,506 B2 | 6/2009 | Ma et al. |
| 7,551,564 B2 | 6/2009 | Mattina |
| 7,567,621 B2 | 7/2009 | Sampath et al. |
| 7,573,900 B2 | 8/2009 | Kim et al. |
| 7,599,327 B2 | 10/2009 | Zhuang |
| 7,616,955 B2 | 11/2009 | Kim |
| 7,627,051 B2 | 12/2009 | Shen et al. |
| 7,664,061 B2 | 2/2010 | Hottinen |
| 7,676,007 B1 | 3/2010 | Choi et al. |
| 7,684,507 B2 | 3/2010 | Levy |
| 7,724,777 B2 | 5/2010 | Sutivong et al. |
| 7,768,979 B2 | 8/2010 | Sutivong et al. |
| 7,916,624 B2 | 3/2011 | Laroia et al. |
| 7,924,699 B2 | 4/2011 | Laroia et al. |
| 7,990,843 B2 | 8/2011 | Laroia et al. |
| 7,990,844 B2 | 8/2011 | Laroia et al. |
| 8,095,141 B2 | 1/2012 | Teague |
| 8,098,568 B2 | 1/2012 | Laroia et al. |
| 8,098,569 B2 | 1/2012 | Laroia et al. |
| 8,199,634 B2 | 6/2012 | Laroia et al. |
| 8,218,425 B2 | 7/2012 | Laroia et al. |
| 8,223,627 B2 | 7/2012 | Laroia et al. |
| 8,295,154 B2 | 10/2012 | Laroia et al. |
| 2001/0021180 A1 | 9/2001 | Lee et al. |
| 2001/0024427 A1 | 9/2001 | Suzuki |
| 2001/0030948 A1 | 10/2001 | Tiedemann, Jr. |
| 2001/0055294 A1 | 12/2001 | Motoyoshi |
| 2002/0015405 A1 | 2/2002 | Sepponen et al. |
| 2002/0018157 A1 | 2/2002 | Zhang et al. |
| 2002/0044524 A1 | 4/2002 | Laroia et al. |
| 2002/0061742 A1 | 5/2002 | Lapaille et al. |
| 2002/0077152 A1 | 6/2002 | Johnson et al. |
| 2002/0085521 A1 | 7/2002 | Tripathi et al. |
| 2002/0090004 A1 | 7/2002 | Rinchiuso |
| 2002/0090024 A1 | 7/2002 | Tan |
| 2002/0101839 A1 | 8/2002 | Farley et al. |
| 2002/0122400 A1 | 9/2002 | Vayanos et al. |
| 2002/0128035 A1 | 9/2002 | Jokinen et al. |
| 2002/0159422 A1 | 10/2002 | Li et al. |
| 2002/0160781 A1 | 10/2002 | Bark et al. |
| 2002/0168946 A1 | 11/2002 | Aizawa et al. |
| 2002/0172293 A1 | 11/2002 | Kuchi et al. |
| 2002/0176398 A1 | 11/2002 | Nidda |
| 2002/0193146 A1 | 12/2002 | Wallace et al. |
| 2003/0002464 A1 | 1/2003 | Rezaiifar et al. |
| 2003/0040283 A1 | 2/2003 | Kawai et al. |
| 2003/0043732 A1 | 3/2003 | Walton et al. |
| 2003/0043764 A1 | 3/2003 | Kim et al. |
| 2003/0063579 A1 | 4/2003 | Lee |
| 2003/0068983 A1 | 4/2003 | Kim et al. |
| 2003/0072280 A1 | 4/2003 | McFarland et al. |
| 2003/0072395 A1 | 4/2003 | Jia et al. |
| 2003/0073409 A1 | 4/2003 | Nobukiyo et al. |
| 2003/0076890 A1 | 4/2003 | Hochwald et al. |
| 2003/0086393 A1 | 5/2003 | Vasudevan et al. |
| 2003/0096579 A1 | 5/2003 | Ito et al. |
| 2003/0103520 A1 | 6/2003 | Chen et al. |
| 2003/0112745 A1 | 6/2003 | Zhuang et al. |
| 2003/0125040 A1 | 7/2003 | Walton et al. |
| 2003/0142648 A1 | 7/2003 | Semper |
| 2003/0147371 A1 | 8/2003 | Choi et al. |
| 2003/0181170 A1 | 9/2003 | Sim |
| 2003/0185310 A1 | 10/2003 | Ketchum et al. |
| 2003/0190897 A1 | 10/2003 | Lei et al. |
| 2003/0193915 A1 | 10/2003 | Lee et al. |
| 2003/0202491 A1 | 10/2003 | Tiedemann, Jr. et al. |
| 2003/0228850 A1 | 12/2003 | Hwang |
| 2003/0235255 A1 | 12/2003 | Ketchum et al. |
| 2003/0236080 A1 | 12/2003 | Kadous et al. |
| 2004/0001429 A1 | 1/2004 | Ma et al. |
| 2004/0002364 A1 | 1/2004 | Trikkonen et al. |
| 2004/0015692 A1 | 1/2004 | Green et al. |
| 2004/0017785 A1 | 1/2004 | Zelst |
| 2004/0048609 A1 | 3/2004 | Kosaka |
| 2004/0058687 A1 | 3/2004 | Kim et al. |
| 2004/0066761 A1 | 4/2004 | Giannakis et al. |
| 2004/0072565 A1 | 4/2004 | Nobukiyo et al. |
| 2004/0077379 A1 | 4/2004 | Smith et al. |
| 2004/0087325 A1 | 5/2004 | Cheng et al. |
| 2004/0097215 A1 | 5/2004 | Abe et al. |
| 2004/0098505 A1 | 5/2004 | Clemmensen |
| 2004/0105489 A1 | 6/2004 | Kim et al. |
| 2004/0114618 A1 | 6/2004 | Tong et al. |
| 2004/0120411 A1 | 6/2004 | Walton et al. |
| 2004/0125792 A1 | 7/2004 | Bradbury et al. |
| 2004/0136344 A1 | 7/2004 | Kim et al. |
| 2004/0136349 A1 | 7/2004 | Walton et al. |
| 2004/0156328 A1 | 8/2004 | Walton et al. |
| 2004/0160914 A1 | 8/2004 | Sarkar |
| 2004/0160933 A1 | 8/2004 | Odenwalder et al. |
| 2004/0162083 A1 * | 8/2004 | Chen et al. .................... 455/454 |
| 2004/0166867 A1 | 8/2004 | Hawe |
| 2004/0166887 A1 | 8/2004 | Laroia et al. |
| 2004/0170152 A1 | 9/2004 | Nagao et al. |
| 2004/0170157 A1 | 9/2004 | Kim et al. |
| 2004/0171384 A1 | 9/2004 | Holma et al. |
| 2004/0179627 A1 | 9/2004 | Ketchum et al. |
| 2004/0185792 A1 | 9/2004 | Alexiou et al. |
| 2004/0202257 A1 | 10/2004 | Mehta et al. |
| 2004/0208138 A1 | 10/2004 | Hayashi et al. |
| 2004/0219819 A1 | 11/2004 | Di Mascio |
| 2004/0219919 A1 | 11/2004 | Whinnett et al. |
| 2004/0224711 A1 | 11/2004 | Panchal et al. |
| 2004/0228313 A1 | 11/2004 | Cheng et al. |
| 2004/0240419 A1 | 12/2004 | Abrishamkar et al. |
| 2004/0240572 A1 | 12/2004 | Brutel et al. |
| 2004/0248604 A1 | 12/2004 | Vaidyanathan |
| 2004/0252529 A1 | 12/2004 | Huber et al. |
| 2004/0252629 A1 | 12/2004 | Hasegawa et al. |
| 2004/0252655 A1 * | 12/2004 | Lim et al. ....................... 370/321 |
| 2004/0252662 A1 | 12/2004 | Cho |
| 2004/0257979 A1 | 12/2004 | Ro et al. |
| 2004/0264507 A1 | 12/2004 | Cho et al. |
| 2005/0002412 A1 | 1/2005 | Sagfors et al. |
| 2005/0002440 A1 | 1/2005 | Alamouti et al. |
| 2005/0002468 A1 | 1/2005 | Walton et al. |
| 2005/0003782 A1 | 1/2005 | Wintzell |
| 2005/0008091 A1 | 1/2005 | Boutros et al. |
| 2005/0009486 A1 | 1/2005 | Al-Dhahir et al. |
| 2005/0013263 A1 | 1/2005 | Kim et al. |
| 2005/0030886 A1 | 2/2005 | Wu et al. |
| 2005/0030964 A1 * | 2/2005 | Tiedemann et al. .......... 370/431 |
| 2005/0034079 A1 | 2/2005 | Gunasekar et al. |
| 2005/0041611 A1 | 2/2005 | Sandhu |
| 2005/0041618 A1 | 2/2005 | Wei et al. |
| 2005/0041775 A1 | 2/2005 | Batzinger et al. |
| 2005/0044206 A1 | 2/2005 | Johansson et al. |
| 2005/0047517 A1 | 3/2005 | Georgios et al. |
| 2005/0052991 A1 | 3/2005 | Kadous |
| 2005/0053081 A1 | 3/2005 | Andersson et al. |
| 2005/0063298 A1 | 3/2005 | Ling et al. |
| 2005/0073976 A1 | 4/2005 | Fujii |
| 2005/0085236 A1 | 4/2005 | Gerlach et al. |
| 2005/0111397 A1 | 5/2005 | Attar et al. |
| 2005/0122898 A1 * | 6/2005 | Jang et al. ....................... 370/218 |
| 2005/0135324 A1 | 6/2005 | Kim et al. |
| 2005/0135498 A1 | 6/2005 | Yee |
| 2005/0141624 A1 | 6/2005 | Lakshmipathi et al. |
| 2005/0147024 A1 | 7/2005 | Jung et al. |
| 2005/0157807 A1 | 7/2005 | Shim et al. |
| 2005/0159162 A1 | 7/2005 | Park |
| 2005/0164709 A1 | 7/2005 | Balasubramanian et al. |
| 2005/0165949 A1 | 7/2005 | Teague |
| 2005/0174981 A1 | 8/2005 | Heath et al. |
| 2005/0175070 A1 | 8/2005 | Grob et al. |
| 2005/0180311 A1 | 8/2005 | Wang et al. |
| 2005/0180313 A1 | 8/2005 | Kim et al. |
| 2005/0181799 A1 * | 8/2005 | Laroia et al. .................. 455/450 |
| 2005/0192011 A1 | 9/2005 | Hong et al. |
| 2005/0195733 A1 | 9/2005 | Walton et al. |
| 2005/0195852 A1 | 9/2005 | Vayanos et al. |
| 2005/0201296 A1 | 9/2005 | Vannithamby et al. |

| | | | | | |
|---|---|---|---|---|---|
| 2005/0207367 A1 | 9/2005 | Onggosanusi et al. | 2006/0292989 A1 | 12/2006 | Gerlach et al. |
| 2005/0239465 A1 | 10/2005 | Lee et al. | 2007/0004430 A1 | 1/2007 | Hyun et al. |
| 2005/0195886 A1 | 11/2005 | Lampinen et al. | 2007/0005749 A1 | 1/2007 | Sampath |
| 2005/0243791 A1 | 11/2005 | Park et al. | 2007/0009011 A1 | 1/2007 | Coulson |
| 2005/0246548 A1 | 11/2005 | Laitinen | 2007/0019596 A1 | 1/2007 | Barriac et al. |
| 2005/0249266 A1 | 11/2005 | Brown et al. | 2007/0025345 A1 | 2/2007 | Bachl et al. |
| 2005/0254416 A1 | 11/2005 | Laroia et al. | 2007/0041404 A1 | 2/2007 | Palanki et al. |
| 2005/0254477 A1 | 11/2005 | Lee et al. | 2007/0041457 A1 | 2/2007 | Kadous et al. |
| 2005/0254556 A1 | 11/2005 | Fujii et al. | 2007/0047485 A1 | 3/2007 | Gorokhov et al. |
| 2005/0259005 A1 | 11/2005 | Chiang et al. | 2007/0047495 A1 | 3/2007 | Ji et al. |
| 2005/0259723 A1 | 11/2005 | Blanchard | 2007/0049218 A1 | 3/2007 | Gorokhov et al. |
| 2005/0259757 A1 | 11/2005 | Wu et al. | 2007/0053282 A1 | 3/2007 | Tong et al. |
| 2005/0264467 A1 | 11/2005 | Lin et al. | 2007/0053383 A1 | 3/2007 | Choi et al. |
| 2005/0265293 A1 | 12/2005 | Ro et al. | 2007/0060178 A1 | 3/2007 | Gorokhov et al. |
| 2005/0276347 A1 | 12/2005 | Mujtaba et al. | 2007/0064669 A1 | 3/2007 | Classon et al. |
| 2005/0276348 A1 | 12/2005 | Vandenameele | 2007/0071147 A1 | 3/2007 | Sampath et al. |
| 2005/0277423 A1 | 12/2005 | Sandhu et al. | 2007/0097853 A1 | 5/2007 | Khandekar et al. |
| 2005/0281290 A1 | 12/2005 | Khandekar et al. | 2007/0097889 A1 | 5/2007 | Wang et al. |
| 2005/0282500 A1 | 12/2005 | Wang et al. | 2007/0097897 A1 | 5/2007 | Teague et al. |
| 2005/0286408 A1 | 12/2005 | Jin et al. | 2007/0097908 A1 | 5/2007 | Khandekar et al. |
| 2005/0289256 A1 | 12/2005 | Cudak et al. | 2007/0097909 A1 | 5/2007 | Khandekar et al. |
| 2006/0002451 A1 | 1/2006 | Fukuta et al. | 2007/0097910 A1 | 5/2007 | Ji et al. |
| 2006/0013285 A1 | 1/2006 | Kobayashi et al. | 2007/0097922 A1 | 5/2007 | Parekh et al. |
| 2006/0018336 A1 | 1/2006 | Sutivong et al. | 2007/0097927 A1 | 5/2007 | Gorokhov et al. |
| 2006/0018347 A1 | 1/2006 | Agrawal | 2007/0097942 A1 | 5/2007 | Gorokhov et al. |
| 2006/0018397 A1 | 1/2006 | Sampath et al. | 2007/0097981 A1* | 5/2007 | Papasakellariou ............ 370/394 |
| 2006/0026344 A1 | 2/2006 | Sun Hsu et al. | 2007/0098050 A1 | 5/2007 | Khandekar et al. |
| 2006/0029289 A1 | 2/2006 | Yamaguchi et al. | 2007/0098120 A1 | 5/2007 | Wang |
| 2006/0034173 A1 | 2/2006 | Teague | 2007/0110172 A1 | 5/2007 | Faulkner et al. |
| 2006/0039332 A1 | 2/2006 | Kotzin | 2007/0115795 A1 | 5/2007 | Gore et al. |
| 2006/0039344 A1 | 2/2006 | Khan | 2007/0149194 A1 | 6/2007 | Das et al. |
| 2006/0040655 A1* | 2/2006 | Kim ......................... 455/426.1 | 2007/0149228 A1 | 6/2007 | Das |
| 2006/0045003 A1 | 3/2006 | Choi et al. | 2007/0159969 A1 | 7/2007 | Das et al. |
| 2006/0050770 A1 | 3/2006 | Wallace et al. | 2007/0160115 A1 | 7/2007 | Palanki et al. |
| 2006/0056340 A1 | 3/2006 | Hottinen et al. | 2007/0165738 A1 | 7/2007 | Barriac et al. |
| 2006/0057958 A1 | 3/2006 | Ngo et al. | 2007/0177631 A1 | 8/2007 | Popovic et al. |
| 2006/0067421 A1 | 3/2006 | Walton et al. | 2007/0177681 A1 | 8/2007 | Choi et al. |
| 2006/0078075 A1 | 4/2006 | Stamoulis et al. | 2007/0183303 A1 | 8/2007 | Pi et al. |
| 2006/0083159 A1 | 4/2006 | Laroia et al. | 2007/0183386 A1 | 8/2007 | Muharemovic et al. |
| 2006/0083183 A1 | 4/2006 | Teague et al. | 2007/0207812 A1 | 9/2007 | Borran et al. |
| 2006/0092054 A1 | 5/2006 | Li et al. | 2007/0211616 A1 | 9/2007 | Khandekar et al. |
| 2006/0104333 A1 | 5/2006 | Rainbolt et al. | 2007/0211667 A1 | 9/2007 | Agrawal et al. |
| 2006/0104381 A1 | 5/2006 | Menon et al. | 2007/0230324 A1 | 10/2007 | Li et al. |
| 2006/0111054 A1 | 5/2006 | Pan et al. | 2007/0242653 A1 | 10/2007 | Yang et al. |
| 2006/0114858 A1 | 6/2006 | Walton et al. | 2007/0263743 A1 | 11/2007 | Lee et al. |
| 2006/0120469 A1 | 6/2006 | Maltsev et al. | 2007/0280336 A1 | 12/2007 | Zhang et al. |
| 2006/0120471 A1 | 6/2006 | Learned et al. | 2007/0281702 A1 | 12/2007 | Lim et al. |
| 2006/0126491 A1 | 6/2006 | Ro et al. | 2008/0039129 A1 | 2/2008 | Li et al. |
| 2006/0133269 A1 | 6/2006 | Prakash et al. | 2008/0063099 A1 | 3/2008 | Laroia et al. |
| 2006/0133455 A1 | 6/2006 | Agrawal et al. | 2008/0095223 A1 | 4/2008 | Tong et al. |
| 2006/0133521 A1 | 6/2006 | Sampath et al. | 2008/0095262 A1 | 4/2008 | Ho et al. |
| 2006/0140289 A1 | 6/2006 | Mandyam et al. | 2008/0181139 A1 | 7/2008 | Rangarajan et al. |
| 2006/0153239 A1 | 7/2006 | Julian et al. | 2008/0214222 A1 | 9/2008 | Atarashi et al. |
| 2006/0155534 A1 | 7/2006 | Lin et al. | 2008/0253279 A1 | 10/2008 | Ma et al. |
| 2006/0156199 A1 | 7/2006 | Palanki et al. | 2008/0267157 A1 | 10/2008 | Lee et al. |
| 2006/0172704 A1 | 8/2006 | Nishio et al. | 2008/0299983 A1 | 12/2008 | Kwak et al. |
| 2006/0189321 A1 | 8/2006 | Oh et al. | 2009/0003466 A1 | 1/2009 | Taherzadehboroujeni et al. |
| 2006/0203708 A1 | 9/2006 | Sampath et al. | 2009/0010351 A1 | 1/2009 | Laroia et al. |
| 2006/0203794 A1 | 9/2006 | Sampath et al. | 2009/0022098 A1 | 1/2009 | Novak et al. |
| 2006/0203891 A1 | 9/2006 | Sampath et al. | 2009/0041150 A1 | 2/2009 | Tsai et al. |
| 2006/0203932 A1 | 9/2006 | Palanki et al. | 2009/0110103 A1 | 4/2009 | Maltsev et al. |
| 2006/0209670 A1 | 9/2006 | Gorokhov et al. | 2009/0180459 A1 | 7/2009 | Orlik et al. |
| 2006/0209732 A1 | 9/2006 | Gorokhov et al. | 2009/0197646 A1 | 8/2009 | Tamura et al. |
| 2006/0209754 A1 | 9/2006 | Ji et al. | 2009/0201826 A1 | 8/2009 | Gorokhov et al. |
| 2006/0209764 A1 | 9/2006 | Kim et al. | 2009/0201872 A1 | 8/2009 | Gorokhov et al. |
| 2006/0209973 A1 | 9/2006 | Gorokhov et al. | 2009/0213750 A1 | 8/2009 | Gorokhov et al. |
| 2006/0215777 A1 | 9/2006 | Krishnamoorthi | 2009/0213950 A1 | 8/2009 | Gorokhov et al. |
| 2006/0218459 A1 | 9/2006 | Hedberg | 2009/0262641 A1 | 10/2009 | Laroia et al. |
| 2006/0223449 A1 | 10/2006 | Sampath et al. | 2009/0262699 A1 | 10/2009 | Wengerter et al. |
| 2006/0233124 A1 | 10/2006 | Palanki | 2009/0285163 A1 | 11/2009 | Zhang et al. |
| 2006/0233131 A1 | 10/2006 | Gore et al. | 2009/0287977 A1 | 11/2009 | Chang et al. |
| 2006/0270427 A1 | 11/2006 | Shida et al. | 2010/0002570 A9 | 1/2010 | Walton et al. |
| 2006/0274836 A1 | 12/2006 | Sampath et al. | 2010/0135242 A1 | 6/2010 | Nam et al. |
| 2006/0285485 A1 | 12/2006 | Agrawal et al. | 2010/0220800 A1 | 9/2010 | Erell et al. |
| 2006/0285515 A1 | 12/2006 | Julian et al. | 2010/0232384 A1 | 9/2010 | Farajidana et al. |
| 2006/0286974 A1 | 12/2006 | Gore et al. | 2010/0238902 A1 | 9/2010 | Ji et al. |
| 2006/0286982 A1 | 12/2006 | Prakash et al. | 2010/0254263 A1 | 10/2010 | Chen et al. |
| 2006/0286995 A1 | 12/2006 | Onggosanusi et al. | 2011/0064070 A1 | 3/2011 | Gore et al. |
| 2006/0291371 A1 | 12/2006 | Sutivong et al. | 2011/0235733 A1 | 9/2011 | Laroia et al. |

| | | | | | | |
|---|---|---|---|---|---|---|
| 2011/0235745 | A1 | 9/2011 | Laroia et al. | EP | 1335504 A2 | 8/2003 |
| 2011/0235746 | A1 | 9/2011 | Laroia et al. | EP | 1376920 | 1/2004 |
| 2011/0235747 | A1 | 9/2011 | Laroia et al. | EP | 1392073 A1 | 2/2004 |
| 2011/0255518 | A9 | 10/2011 | Agrawal et al. | EP | 1434365 A2 | 6/2004 |
| 2011/0306291 | A1 | 12/2011 | Ma et al. | EP | 1441469 A2 | 7/2004 |
| 2012/0002623 | A1 | 1/2012 | Khandekar et al. | EP | 1445873 A2 | 8/2004 |
| 2012/0063441 | A1 | 3/2012 | Palanki | EP | 1465449 A1 | 10/2004 |
| 2012/0120925 | A1 | 5/2012 | Kadous et al. | EP | 1478204 A2 | 11/2004 |
| 2012/0140798 | A1 | 6/2012 | Kadous et al. | EP | 1507421 | 2/2005 |
| 2012/0140838 | A1 | 6/2012 | Kadous et al. | EP | 1513356 A2 | 3/2005 |
| 2013/0016678 | A1 | 1/2013 | Laroia et al. | EP | 1531575 A2 | 5/2005 |
| | | | | EP | 1533950 | 5/2005 |

FOREIGN PATENT DOCUMENTS

| | | | | | |
|---|---|---|---|---|---|
| CA | 2540688 | | 5/2005 | EP 1538863 | 6/2005 |
| CA | 2577369 | | 3/2006 | EP 1542488 A1 | 6/2005 |
| CL | 1400-1993 | | 12/1994 | EP 1601149 A2 | 11/2005 |
| CL | 846-1997 | | 1/1998 | EP 1643669 A1 | 4/2006 |
| CL | 953-1997 | | 1/1998 | EP 1898542 A1 | 3/2008 |
| CL | 27102004 | | 8/2005 | EP 1941693 | 7/2011 |
| CL | 22892004 | | 9/2005 | FR 2584884 | 1/1987 |
| CL | 3086-2004 | | 10/2005 | GB 2279540 | 1/1995 |
| CL | 30862004 | | 10/2005 | GB 2348776 | 10/2000 |
| CL | 29932005 | | 5/2006 | GB 2412541 | 9/2005 |
| CL | 15202006 | | 12/2006 | IL 167573 | 2/2011 |
| CL | 2203-2006 | | 2/2007 | IL 201872 | 5/2012 |
| CL | 15212006 | | 3/2007 | JP 4301931 | 10/1992 |
| CL | 14922006 | | 4/2007 | JP 7336323 A | 12/1995 |
| CL | 14892006 | | 5/2007 | JP 8116329 A | 5/1996 |
| CL | 14902006 | | 5/2007 | JP 08288927 | 11/1996 |
| CL | 29062006 | | 5/2007 | JP 9008725 A | 1/1997 |
| CL | 29072006 | | 5/2007 | JP H09501548 A | 2/1997 |
| CL | 29042006 | | 6/2007 | JP 9131342 | 5/1997 |
| CL | 29012006 | | 10/2007 | JP 9182148 A | 7/1997 |
| CL | 29022006 | | 10/2007 | JP 09214404 | 8/1997 |
| CL | 29032006 | | 10/2007 | JP 9284200 A | 10/1997 |
| CL | 29082006 | | 10/2007 | JP 10117162 | 5/1998 |
| CL | 46151 | | 12/2009 | JP 10322304 | 12/1998 |
| CN | 1252919 | | 5/2000 | JP 11191756 A | 7/1999 |
| CN | 1267437 | | 9/2000 | JP 11196109 | 7/1999 |
| CN | 1284795 | | 2/2001 | JP 11508417 T | 7/1999 |
| CN | 1296682 | | 5/2001 | JP 11239155 A | 8/1999 |
| CN | 1344451 | | 4/2002 | JP 11298954 | 10/1999 |
| CN | 1346221 | | 4/2002 | JP 11331927 A | 11/1999 |
| CN | 1383631 | | 12/2002 | JP 2000102065 A | 4/2000 |
| CN | 1386344 | | 12/2002 | JP 2000184425 | 6/2000 |
| CN | 1402916 | A | 3/2003 | JP 2000511750 A | 9/2000 |
| CN | 1424835 | | 6/2003 | JP 2000332724 | 11/2000 |
| CN | 1132474 | C | 12/2003 | JP 2001016644 A2 | 1/2001 |
| CN | 1467938 | A | 1/2004 | JP 2001045573 | 2/2001 |
| CN | 1487755 | A | 4/2004 | JP 2001057545 A | 2/2001 |
| CN | 1520220 | | 8/2004 | JP 2001156732 A | 6/2001 |
| CN | 1525678 | | 9/2004 | JP 2001238269 | 8/2001 |
| CN | 1636346 | | 7/2005 | JP 2001245355 A | 9/2001 |
| CN | 1642051 | A | 7/2005 | JP 2001249802 | 9/2001 |
| CN | 1647436 | | 7/2005 | JP 2001521698 A | 11/2001 |
| DE | 19800653 | A1 | 7/1999 | JP 2001526012 | 12/2001 |
| DE | 19800953 | | 7/1999 | JP 2002026790 | 1/2002 |
| DE | 19957288 | | 5/2001 | JP 2002515203 T | 5/2002 |
| DE | 10240138 | | 8/2003 | JP 2002534925 T | 10/2002 |
| DE | 10254384 | | 6/2004 | JP 2002534941 | 10/2002 |
| EP | 0488976 | | 6/1992 | JP 2003032218 | 1/2003 |
| EP | 0568291 | A2 | 11/1993 | JP 2003500909 | 1/2003 |
| EP | 0786889 | A1 | 7/1997 | JP 200369472 | 3/2003 |
| EP | 0805576 | A2 | 11/1997 | JP 2003101515 | 4/2003 |
| EP | 0807989 | A1 | 11/1997 | JP 2003169367 A | 6/2003 |
| EP | 0844796 | | 5/1998 | JP 2003174426 | 6/2003 |
| EP | 0981222 | A2 | 2/2000 | JP 2003199173 A | 7/2003 |
| EP | 1001570 | A2 | 5/2000 | JP 2003520523 | 7/2003 |
| EP | 1047209 | A1 | 10/2000 | JP 2003249907 A | 9/2003 |
| EP | 1061687 | | 12/2000 | JP 2003292667 A | 10/2003 |
| EP | 1091516 | A1 | 4/2001 | JP 2003347985 | 12/2003 |
| EP | 1093241 | A1 | 4/2001 | JP 2003348047 | 12/2003 |
| EP | 1148673 | A2 | 10/2001 | JP 2004007643 A | 1/2004 |
| EP | 1180907 | A2 | 2/2002 | JP 2004023716 | 1/2004 |
| EP | 1187506 | A1 | 3/2002 | JP 2004048716 | 2/2004 |
| EP | 1204217 | | 5/2002 | JP 200472457 | 3/2004 |
| EP | 1255369 | | 11/2002 | JP 2004072157 A | 3/2004 |
| EP | 1267513 | | 12/2002 | JP 2004096142 | 3/2004 |
| EP | 1286490 | | 2/2003 | JP 2004507950 A | 3/2004 |
| | | | | JP 2004153676 | 5/2004 |

| | | | | | | | |
|---|---|---|---|---|---|---|---|
| JP | 2004158901 A | | 6/2004 | TW | 200401572 | | 1/2004 |
| JP | 2004162388 A | | 6/2004 | TW | I232040 | | 5/2005 |
| JP | 2004194262 A | | 7/2004 | TW | 248266 | | 1/2006 |
| JP | 2004221972 | | 8/2004 | TW | 200718128 | | 5/2007 |
| JP | 2004266818 | | 9/2004 | WO | WO9408432 | | 4/1994 |
| JP | 2004529524 T | | 9/2004 | WO | WO95021494 | | 8/1995 |
| JP | 2004297276 A | | 10/2004 | WO | WO9613920 A1 | | 5/1996 |
| JP | 2004297756 | | 10/2004 | WO | WO9701256 | | 1/1997 |
| JP | 2004534456 | | 11/2004 | WO | WO9737456 A2 | | 10/1997 |
| JP | 2004535106 A | | 11/2004 | WO | WO9746033 A2 | | 12/1997 |
| JP | 2005020530 | | 1/2005 | WO | WO9800946 | | 1/1998 |
| JP | 2005502218 T | | 1/2005 | WO | WO9814026 A1 | | 4/1998 |
| JP | 2005506757 | | 3/2005 | WO | WO9837706 A2 | | 8/1998 |
| JP | 2005130491 A | | 5/2005 | WO | WO9848581 A1 | | 10/1998 |
| JP | 2005006337 | | 6/2005 | WO | WO9853561 | | 11/1998 |
| JP | 2005197772 | | 7/2005 | WO | WO9854919 A2 | | 12/1998 |
| JP | 2005203961 | | 7/2005 | WO | WO9941871 A1 | | 8/1999 |
| JP | 2005521327 | | 7/2005 | WO | WO9944313 | | 9/1999 |
| JP | 2005521358 | | 7/2005 | WO | WO9944383 A1 | | 9/1999 |
| JP | 2006505172 | | 2/2006 | WO | WO9952250 A1 | | 10/1999 |
| JP | 2006506860 A | | 2/2006 | WO | WO9953713 | | 10/1999 |
| JP | 2006211537 A | | 8/2006 | WO | WO9959265 | | 11/1999 |
| JP | I269549 | | 12/2006 | WO | WO9960729 A1 | | 11/1999 |
| JP | 2007503790 | | 2/2007 | WO | WO0002397 | | 1/2000 |
| JP | 2007519281 | | 7/2007 | WO | WO0033503 | | 6/2000 |
| JP | 2007520309 A | | 7/2007 | WO | WO0070897 | | 11/2000 |
| JP | 2007525043 T | | 8/2007 | WO | WO0101596 | | 1/2001 |
| JP | 2007527127 | | 9/2007 | WO | WO0117125 A1 | | 3/2001 |
| JP | 2008505587 A | | 2/2008 | WO | WO0126269 | | 4/2001 |
| JP | 2008535398 | | 8/2008 | WO | WO0139523 A2 | | 5/2001 |
| JP | 4188372 B2 | | 11/2008 | WO | WO0145300 | | 6/2001 |
| JP | 2008546314 | | 12/2008 | WO | 0148969 | | 7/2001 |
| JP | 04694628 B2 | | 6/2011 | WO | WO0158054 A1 | | 8/2001 |
| KR | 0150275 B1 | | 11/1998 | WO | WO0160106 | | 8/2001 |
| KR | 20000060428 | | 10/2000 | WO | WO0169814 A1 | | 9/2001 |
| KR | 100291476 B1 | | 3/2001 | WO | 0182544 | | 11/2001 |
| KR | 20010056333 | | 4/2001 | WO | WO0182543 | | 11/2001 |
| KR | 20010087715 A | | 9/2001 | WO | WO0189112 A1 | | 11/2001 |
| KR | 20030007965 | | 1/2003 | WO | WO0193505 | | 12/2001 |
| KR | 20030035969 A | | 5/2003 | WO | WO0204936 A1 | | 1/2002 |
| KR | 20040063057 | | 7/2004 | WO | WO0207375 | | 1/2002 |
| KR | 200471652 | | 8/2004 | WO | WO0215616 | | 2/2002 |
| KR | 20040103441 A | | 12/2004 | WO | 0215746 | | 3/2002 |
| KR | 20050061559 | | 6/2005 | WO | WO0231991 A2 | | 4/2002 |
| KR | 20050063826 A | | 6/2005 | WO | WO0233848 A2 | | 4/2002 |
| KR | 100606099 | | 7/2006 | WO | 0249306 | | 6/2002 |
| RE | 2238611 C1 | | 10/2004 | WO | WO0245456 A1 | | 6/2002 |
| RU | 95121152 | | 12/1997 | WO | WO0249305 | | 6/2002 |
| RU | 2141168 C1 | | 11/1999 | WO | WO0249385 A2 | | 6/2002 |
| RU | 2141706 C1 | | 11/1999 | WO | WO02060138 | | 8/2002 |
| RU | 2159007 C2 | | 11/2000 | WO | WO02065675 | | 8/2002 |
| RU | 2162275 C2 | | 1/2001 | WO | 02082689 A2 | | 10/2002 |
| RU | 2192094 | | 10/2002 | WO | 02089434 A1 | | 11/2002 |
| RU | 2197778 C2 | | 1/2003 | WO | WO02093782 A1 | | 11/2002 |
| RU | 2207723 C1 | | 6/2003 | WO | WO02093819 A1 | | 11/2002 |
| RU | 2208913 | | 7/2003 | WO | WO02100027 A1 | | 12/2002 |
| RU | 2210866 C2 | | 8/2003 | WO | 03001696 | | 1/2003 |
| RU | 2216101 C2 | | 11/2003 | WO | WO03001761 A1 | | 1/2003 |
| RU | 2216105 C2 | | 11/2003 | WO | WO03001981 A2 | | 1/2003 |
| RU | 2225080 | | 2/2004 | WO | WO03003617 | | 1/2003 |
| RU | 2235429 C1 | | 8/2004 | WO | WO03019819 | | 3/2003 |
| RU | 2235432 | | 8/2004 | WO | WO03030414 | | 4/2003 |
| RU | 2237379 C2 | | 9/2004 | WO | WO03034644 A1 | | 4/2003 |
| RU | 2242091 C2 | | 12/2004 | WO | WO03043262 | | 5/2003 |
| RU | 2003125268 | | 2/2005 | WO | WO03043369 | | 5/2003 |
| RU | 2285388 | | 3/2005 | WO | WO03058871 A1 | | 7/2003 |
| RU | 2250564 | | 4/2005 | WO | WO03067783 | | 8/2003 |
| RU | 2257008 | | 7/2005 | WO | WO03069832 A1 | | 8/2003 |
| RU | 2267224 | | 12/2005 | WO | WO03073646 | | 9/2003 |
| RU | 2005129079 A | | 2/2006 | WO | WO03075479 | | 9/2003 |
| RU | 2285338 C2 | | 10/2006 | WO | 03088538 A1 | | 10/2003 |
| RU | 2285351 C2 | | 10/2006 | WO | WO03085876 | | 10/2003 |
| RU | 2292655 | | 1/2007 | WO | WO03094384 | | 11/2003 |
| RU | 2335864 C2 | | 10/2008 | WO | WO03103331 | | 12/2003 |
| RU | 2349043 C2 | | 3/2009 | WO | WO04002047 | | 12/2003 |
| SU | 1320883 | | 6/1987 | WO | WO2004004370 | | 1/2004 |
| TW | 508960 | | 11/2002 | WO | WO2004008671 | | 1/2004 |
| TW | 510132 | | 11/2002 | WO | WO2004008681 A1 | | 1/2004 |
| TW | 200302642 | | 8/2003 | WO | WO2004015912 | | 2/2004 |

| | | |
|---|---|---|
| WO | WO2004016007 | 2/2004 |
| WO | WO2004021605 A1 | 3/2004 |
| WO | WO2004023834 A1 | 3/2004 |
| WO | WO2004030238 A1 | 4/2004 |
| WO | WO2004032443 A1 | 4/2004 |
| WO | 2004040827 | 5/2004 |
| WO | WO2004038954 | 5/2004 |
| WO | WO2004038972 | 5/2004 |
| WO | WO2004038988 | 5/2004 |
| WO | WO2004040690 A2 | 5/2004 |
| WO | WO2004047354 | 6/2004 |
| WO | WO2004049618 A1 | 6/2004 |
| WO | WO2004051872 A2 | 6/2004 |
| WO | WO2004062255 | 7/2004 |
| WO | WO2004064294 | 7/2004 |
| WO | WO2004064295 | 7/2004 |
| WO | WO2004066520 | 8/2004 |
| WO | WO2004068721 A2 | 8/2004 |
| WO | WO2004073276 | 8/2004 |
| WO | WO2004075023 | 9/2004 |
| WO | WO2004075442 | 9/2004 |
| WO | WO2004075448 | 9/2004 |
| WO | WO2004075468 | 9/2004 |
| WO | WO2004075596 | 9/2004 |
| WO | WO2004077850 A2 | 9/2004 |
| WO | WO2004084509 | 9/2004 |
| WO | 2004086711 | 10/2004 |
| WO | WO2004086706 A1 | 10/2004 |
| WO | 2004095851 | 11/2004 |
| WO | 2004098072 | 11/2004 |
| WO | WO2004095730 A1 | 11/2004 |
| WO | WO2004095854 | 11/2004 |
| WO | WO2004098222 | 11/2004 |
| WO | WO2004102815 | 11/2004 |
| WO | WO2004102816 A2 | 11/2004 |
| WO | 2004105272 A1 | 12/2004 |
| WO | WO2004114549 | 12/2004 |
| WO | WO2005002253 A1 | 1/2005 |
| WO | 2005011163 A1 | 2/2005 |
| WO | 2005018270 | 2/2005 |
| WO | WO 2005/015941 | 2/2005 |
| WO | WO2005015795 A1 | 2/2005 |
| WO | WO2005015797 | 2/2005 |
| WO | WO2005015810 | 2/2005 |
| WO | WO2005020488 A1 | 3/2005 |
| WO | WO2005020490 | 3/2005 |
| WO | WO2005022811 A2 | 3/2005 |
| WO | WO2005025110 A2 | 3/2005 |
| WO | 2005032004 A1 | 4/2005 |
| WO | WO2005043855 | 5/2005 |
| WO | WO2005046080 | 5/2005 |
| WO | 2005055484 A1 | 6/2005 |
| WO | 2005055527 | 6/2005 |
| WO | WO2005060192 A1 | 6/2005 |
| WO | 2005065062 | 7/2005 |
| WO | WO2005069538 A1 | 7/2005 |
| WO | WO2005074184 | 8/2005 |
| WO | 2005096538 | 10/2005 |
| WO | WO2005122628 | 12/2005 |
| WO | 2006007292 A2 | 1/2006 |
| WO | WO2006019710 | 2/2006 |
| WO | 2006026344 | 3/2006 |
| WO | WO2006044487 | 4/2006 |
| WO | 2006069301 | 6/2006 |
| WO | WO2006069300 | 6/2006 |
| WO | WO2006069397 | 6/2006 |
| WO | WO2006077696 | 7/2006 |
| WO | WO2006096784 A1 | 9/2006 |
| WO | WO2006099349 A1 | 9/2006 |
| WO | WO2006099545 A1 | 9/2006 |
| WO | WO2006099577 A1 | 9/2006 |
| WO | WO2006127544 A2 | 11/2006 |
| WO | 2006134032 | 12/2006 |
| WO | 2006138196 | 12/2006 |
| WO | 2006138573 | 12/2006 |
| WO | WO2006138581 A2 | 12/2006 |
| WO | WO2007024934 | 3/2007 |
| WO | WO2007024935 | 3/2007 |
| WO | WO2007025160 | 3/2007 |
| WO | WO2007051159 | 5/2007 |
| WO | 02082743 | 10/2007 |

OTHER PUBLICATIONS

Lettieri et al: "Adaptive frame length control for improving wireless link throughput, range, and energy efficiency", INFOCOM 98, 17th Annual Joint Conference of the IEEE Computer and Communications Societies, Mar. 29-Apr. 2, 1998, pp. 564-571, vol. 2, IEEE San Francisco, CA, New York, New York.

Molisch, et al., MIMO systems with antenna selection, IEEE Microwave Magazine, URL: http://ieeexplore.ieee.org/iel5/6668/28677/01284943.pdf, Retrieved on Dec. 8, 2006, pp. 46-56 (2004).

Tomcik, J.: "MBFDD and MBTDD Wideband Mode: Technology Overview," IEEE 802.20 Working Group Mobile Broadband Wireless Access, Jan. 2006, pp. 1-109, XP002429968.

Toufik I et al., "Channel allocation algorithms for multi-carrier systems", Vehicular Technology Conference, 2004. VTC2004-Fall. 2004 IEEE 60th Los Angeles, CA, USA Sep. 26-29, 2004, pp. 1129-1133, XP010786798, ISBN: 07-7803-8521-7.

John B. Groe, et al., "CDMA Mobile Radio Design", Sep. 26, 2001, pp. 157-159, 580530, XP002397967, Artech House, Norwood, MA 02062.

Junyi Li, et al., "An Integrated Approach Based on Cross-Layer Optimization—Designing a Mobile Broadband Wireless Access Network", IEEE Signal Processing Magazine, Sep. 2004, vol. 21, No. 5, IEEE Service Center, Piscataway, NJ, US.

Jim Tomcik, QUALCOMM Incorporated, "QFDD Technology Overview Presentation", IEEE 802.20 Working Group on Mobile Broadband Wireless Access, Oct. 28, 2005.

TIA-1121.001 "Physical Layer for Ultra Mobile Broadband (UMB) Air Interface Specification", 3GPP2 C.S0084-001 Version 2.0 (Aug. 2007).

TIA-1121.002 "Medium Access Control layer for Ultra Mobile Broadband (UMB) Air Interface Specification", 3GPP2 C.20084-002, Version 2.0 (Aug. 2007).

Lau, et al., "On the Design of MIMO Block-Fading Channels with Feedback-Link Capacity Constraint," IEEE Transactions on Communications, IEEE Service Center, Piscataway, NJ, US, v. 52, No. 1, Jan. 2004, pp. 62-70, XP001189908.

Digital cellular telecommunications system (Phase 2+); Mobile radio interface layer 3 specification (GSM 04.08 version 7..7.1 Release 1998); ETSI EN 300 940 V7.7.7 (Oct. 2000), pp. 1,2,91-93.

International Search Report—PCT/US07/086197, International Search Authority—European Patent Office, Jul. 21, 2008.

Written Opinion—PCT/US07/086197, International Search Authority—European Patent Office, Jul. 21, 2008.

3GPP TS 33.220 V.1.1.0 XX,XX, "3rd Generation Partnership Projects; Technical Specification Group Services and System Aspects; Generic Authentication Architecture (GAA); Generic Bootstrapping Architecture (Release 6)" Feb. 9, 2004, pp. 1-17, figure 4, XP002996023.

3rd Generation Partnership Project; Technical Specification Group Radio Access Network; Physical Layer Aspects for Evolved UTRA (Release 7), 3GPP TR 25.814 v0.3.1 (Nov. 2005).

B. Sklar: "The process of thus correcting the channel-induced distortion is called equalization", Digital Communications, PTR Prentice Hall, Upper Saddle River, New Jersey, 1998, Formatting and Baseband Transmission, Chap. 2, Section 2.11.2, pp. 104-106.

Bahai, Saltzberg: "System Architecture," Multi-Carrier Digital Communications, Kluwer Academic, New York, NY, XP-002199501, 1999, pp. 17-21.

Bingham: "Other Types of MCM," ADSL, VDSL, and Multicarrier Modulation, John wiley & Sons, New York, XP-002199502. 2000, pp. 111-113.

Chennakeshu, et al. "Capacity Analysis of a TDMA-Based Slow-Frequency-Hopped Cellular System," IEEE Transaction on Vehicular Technology, vol. 45., No. 3 Aug. 1996, pp. 531-542.

Chiani, et al. "Outage Evaluation for Slow Frequency-Hopping Mobile Radio Systems" IEEE Transactions on Communications, vol. 47, No. 12, Dec. 1999, pp. 1865-1874.

Choi, et al., "Design of the Optimum Pilot Pattern for Channel Estimation in OFDM Systems," Global Telecommunications Conference, IEEE Communications Society, Globecom, Dallas, Texas (2004), p. 3661-3665.

Czylwik: "Comparison Between Adaptive OFDM and Single Carrier Modulation with Frequency Domain Equalization," IEEE 47th Vehicular Technology Conference, vol. 2, May 4-7, 1997, pp. 865-869.

Das et al., "On the Reverse Link Interference Structure for Next Generation Cellular Systems," Global Telecommunications Conference, 2004. Globecom '04, IEEE, vol. 5 IEEE Nov. 29-Dec. 3, 2004, pp. 3068-3072.

Dinis R; Ralconer D; Tonglam C; Sabbaghian M: "A Multiple Access Scheme for the Uplink of Broadband Wireless Systems" Global Telecommunications Conference, 2004. Globecom "04. IEEE Dallas, TX, USA Nov. 29-Dec. 3, 2004, vol. 6, pp. 3808-3812, XP010758449 Piscataway, NJ, USA, IEEE.

Don Torrieri, "Cellular Frequency-Hopping CDMA Systems," IEEE Vehicular Technology Conference, May 16, 1999, pp. 919-925.

Fuchs, et al., "A Novel Tree-Based Scheduling Algorithm for the Downlink of Multi-User MIMO Systems with ZF Beamforming," IEEE International Conference on Acoustics, Speech, and Signal Processing, Philadelphia, PA, USA, 2005, 3.

Hermann Rohling et al., : "Performance Comparison of Different Multiple Access Schemes for the Downlink of an OFDM Communication System", Vehicular Technology Conference, 1997, 47th IEEE, vol. 3, May 4-7, 1997, pp. 1365-1369.

Hill, et al., "Cyclic Shifting and Time Inversion of Partial Transmit Sequences to Reduce the Peak-to-Average Power Ratio in OFDM," IEEE International Symposium on Personal, Indoor and Mobile Radio Communications, vol. 2, Sep. 18, 2000, Piscataway, NJ, pp. 1256-1259.

Hui Won Je et al, "A Novel Multiple Access Scheme for Uplink Cellular Systems 1," Vehicular Technology Conference, 2004, VTC2004-fall, 2004 IEEE 60th Los Angeles, CA, US, Sep. 26-29, 2004, Piscataway, NY, pp. 984-988.

J.S. Chow and J.M. Cioffi: "A cost-effective maximum likelihood reciever for multicarrier systems", Proc. IEEE Int. Conf. on Comm., pp. 948-952, Jun. 1992.

Kaleh: "Channel Equalization for Block Transmission Systems," IEEE Journal on Selected Areas in Communications, vol. 13, No. 1, Jan. 1995, pp. 110-121.

Kappes, J.M., and Sayegh, S.1., "Programmable Demultiplexer/Demodulator Processor," COMSAT Laboratories, IEEE, 1990, pp. 230-234.

Karsten Bruninghaus et al., : "Multi-Carrier Spread Spectrum and It's relationship to Single-Carrier Transmission", Vehicular technology Conference, 1998, VTC 98, 48th IEEE, vol. 3, May 18-21, 1998, pp. 2329-2332.

Keller, et al.: "Adaptive Multicarrier Modulation: A Convenient Framework for Time-Frequency Processing in Wireless Communications," Proceedings of the IEEE, vol. 88, No. 5, May 2000, pp. 611-640.

Kim, et al. "Performance of TDMA System With SFH and 2-Bit Differentially Detected GMSK Over Rayleigh Fading Channel," IEEE Vehicular Technology Conference, Apr. 28, 1996, pp. 789-793.

Kishiyama et al., Investigation of optimum pilot channle structure for VSF-OFCDM broadband wireless access in forward link, VTC 2003-Spring, The 57th IEEE Semiannual Vehicular Technology Conference, Proceedings JEJU, korea, Apr. 22-25, 2003, pp. 139-144.

Kostic, et al. "Dynamic Frequency Hopping in Wireless Cellular Systems-Simulations of Full-Replacement and Reduced-Overhead Methods," IEEE Vehicular Technology Conference, May 16, 1999, pp. 914-918.

Kostic, et al. "Fundamentals of Dynamic Frequency Hopping in Cellular Systems," IEEE Journal on Selected Areas in Communications, vol. 19, No. 11, Nov. 2001, pp. 2254-2266.

Lacroix, et al.: "A Study of OFDM Parameters for High Data Rate Radio LAN's," 2000 IEEE 51st Vehicular Technology Conference Proceedings, vol. 2, May 15-18, 2000, pp. 1075-1079.

Leon, et al., "Cyclic Delay Diversity for Single Carrier-Cyclic Prefix Systems," Conference Record of the Thirty-Ninth Asilomar Conference on Signals, Systems and Computers, Oct. 28, 2005, Piscataway, NJ, pp. 519-523.

Lott: "Comparison of Frequency and Time Domain Differential Modulation in an OFDM System for Wireless ATM," 1999 IEEE 49th Vehicular Technology Conference, vol. 2, Jul. 1999, pp. 877-883.

Mignone, et al.: "CD3-OFDM: A New Channel Estimation Method to Improve the Spectrum Efficiency in Digital Terrestrial Television Systems," International Broadcasting Convention, Sep. 14-18, 1995 Conference Publication No. 413, IEE 1995, pp. 122-128.

Naofal Al-Dhahir: "A Bandwidth-Optimized Reduced-Complexity Equalized Multicarrier Transceiver", IEEE Transactions on Communications, vol. 45, No. 8, Aug. 1997.

Naofal Al-Dhahir: "Optimum Finite-Length Equalization for Multicarrier Transceivers", IEEE Trans. on Comm., pp. 56-64, Jan. 1996.

Nassar et al., "Introduction of Carrier Interference to Spread Spectrum Multiple Access," Wireless Communications and Systems, 1999 Emerging Technologies Symposium, IEEE, Apr. 12-13, 1999, pp. 1-5.

Natarajan, et al., "High-Performance MD-CDMA via Carrier Interferometry Codes," IEEE Transactions on Vehicular Technology, 2001, 50 (6).

NTT DoCoMo, et al.: "Orthogonal Common Pilot Channel and Scrambling Code in Evolved UTRA Downlink," 3GPP TSG RAN WG1 #42 on LTE, pp. 1-8 (Aug.-Sep. 2005).

S. Nishimura et al., "Downlink Null-Formation Using Receiving Antenna Selection in MIMO/SDMA", Technical Search Report of Electric Information Communication Academic Conference, Feb. 28, 2002, vol. 101, No. 683, pp. 17-22, RCS 2001-286.

Sandeep Chennakeshu et al., "A comparison of diversity schemes for a mixed-mode slow frequency-hopped cellular system," Global Telecommunications Conference, 1993, including a Communications Theory Mini-Conference. Technical Program Conference Record, IEEE in Houston. GLOBECOM "93., IEEE, Nov. 29, 1993, pp. 1749-1753.

Sari, et al., "Transmission Techniques for Digital Terrestrial TV Broadcasting," IEEE Communications Magazine, Feb. 1995, pp. 100-109.

Schnell et al., "Application of IFDMA to Mobile Radio Transmission",IEEE 1998 International Conference on Universal Personal Communications,vol. 2, Oct. 5-9, 1998,pp. 1267-1272.

Schnell et al.,: "A Promising New Wideband Multiple-Access Scheme for Future Mobile Communications Systems" European Transactions on Telecommunications, vol. 10, No. 4, Jul. 1999, pp. 417-427.

Shattil et al., "Array Control Systems for Multicarrier Protocols Using a Frequency-Shifted Feedback Cavity", Radio and Wireless Conference EEE, Aug. 1-4, 1999.

Sorger U., et al., "Interleaved FDMA-A New Spread-Spectrum Multiple-Access Scheme, XP010284733," Communications, Conference Record, IEEE, Atlanta, GA, 1998, 1013-1017.

Tellado, "Multicarrier Modulation with Low Par," Kluwer Academic, Dordrecht, NL, XP-002199500, 2000, pp. 6-11 and 55-60.

Tellambura, "Use of m-sequences for OFDM Peak-to-Average Power Ratio Reduction," Electronics Letters, vol. 33, No. 15, Jul. 17, 1997, pp. 1300-1301.

"The TLS Protocol", Version 1.0, Network Working Group, Request for Comments 2246, pp. 1-100 (Jan. 1999).

TIA/EIA/IS-2000 Standards for CDMA2000 Spread Spectrum Systems 3GPP2 CS0001-0 Version Jul. 10, 1999.

TIA/EIA/IS-95, Mobile Station-Base Station Compatibility Standard for Dual-Mode Wideband Spread Spectrum Cellular System, Jul. 1993, Sections 6-25-6-26.

Wang et al., "Improving performance of multi-user OFDM systems using bit-wise interleaver" Electronics Letters IEE Stevenage, GB, vol. 37. No. 19, Sep. 13, 2001, pp. 1173-1174 XP006017222.

Xiaodong, et al., "M-Sequences for OFDM Peak-to-Average Power Ratio Reduction and Error Correction," Electronics Letters, vol. 33, Issue 7, Mar. 27, 1997, pp. 554-555.

Yun et al., "Performance of an LDPC-Coded Frequency-Hopping QFDMA System Based on Resource Allocation in the Uplink"

Vehicular Technology—Conference 2004. VTO 2004-Spring, 2004 IEEE 59th Milan, Italy May 17-19, 2004, Piscataway, NJ USA, vol. 4, May 17, 2004. pp. 1925-1928. XP010766497.

Zekri, et al., "DMT Signals with Low Peak-to-Average Power Ratio," Proceedings, IEEE International Symposium on Computers and Communications, Jul. 6-8, 1999, pp. 362-368.

Adaptive, asynchronous incremental redundancy (A-IR) with fixed transmission time intervals TTI pp. 10-83-1087, 2002.

Preliminary Report on Patentability—PCT/US06/060291, International Bureau of WIPO—Geneva, Apr. 2008.

Search Report Report—PCT/US06/060291, International Search Authority—European Patent Office, May 3, 2007.

Sklar, B., "The process of thus correcting the channel-Induced distortion is called equalization", Digital Communications, PTR Prentice Hall, Upper Saddle River, New Jersey, 1998, Formatting and Baseband Transmission, Chap. 2, Section 2.11.2, pp. 104-106.

Taiwan Search Report—TW096146164—TIPO—Jun. 1, 2011.

Alcatel-Lucent, et al., "Dedicated Reference Signals for Precoding in E-UTRA Downlink" 3GPP Draft; R1-071718, 3rd Generation Partnership Project (3GPP), Mobile Competence Centre ; 650, Route Des Lucioles ; F-06921 Sophia-Antipolis Cedex ; France, vol. RAN WG1, No. St. Julian; Apr. 3, 2007, XP050105640 [retrieved on Apr. 3, 2007].

Bengtsson, M. et al, "A Generalization of Weighted Subspace Fitting to Full-Rank Models", IEEE Transactions on Signal Processing, IEEE Service Center, New York, NY, US, vol. 49, No. 5, pp. 1002-1012, May 1, 2001.

Dammann, A. et al., "Beamforming in Combination with Space-Time Diversity for Broadband OFDM Systems", ICC 2002. 2002 IEEE International Conference on Communications. Apr. 28-May 2, 2002, pp. 165-171, XP010589479.

European Search Report—EP10184156—Search Authority—Munich—Jun. 14, 2012.

Ken Murakami et al., "Status Toward Standardization at IEEE 802.3ah and items on the construction of GE-PON system ," Technical Report of the Institute of Electronics, Information and Communication Engineers, Jun. 13, 2003, vol. 103, No. 124, pp. 1-6, IN2003-24.

Physical Channels and Multiplexing in Evolved UTRA Downlink TSG-RAN Working Group 1 Meeting, XX, XX, vol. RI-050590, Jun. 20, 2005, pp. 1-24. XP003006923 the whole document.

Siemens, "Evolved UTRA uplink scheduling and frequency reuse" [online], 3GPP TSG-RAN WG1 # 41 R1-050476. Internet <URL:http://www.3gpp.org/ftp/tsg_ran/WG1_RL1/TSGR1_41/Docs/R1-050476.zip>, May 9, 2005.

Viswanath, P. et al, "Opportunistic Beamforming Using Dumb Antennas" IEEE Transactions on Information Theory, IEEE USA, vol. 48, No. 6, Jun. 2002, pp. 1277-1294, XP002314708 ISSN: 0018-9448 abstract right-hand column, paragraph 1.

Yatawatta, S. et al., "Energy Efficient Channel Estimation in MIMO Systems", 2005 IEEE International Conference on Acoustics, Speech, and Signal Processing, Mar. 18-23, 2005, Philadelphia, vol. 4, pp. 317-320, Mar. 18, 2005.

Blum, R. et al: "On Optimum MIMO with Antenna Selection," IEEE International Conference on Communications: Conference Proceedings, vol. 1, Apr. 28, 2002, pp. 386-390.

Catreux, S. et al.: "Simulation results for an interference-limited multiple input multiple output cellular system," Global Telecommunications Conference, 2000. GLOBECOM '00. IEEE. Dec. 1, 2000. vol. 2, pp. 1094-1096, http://ieeexplore.ieee.org/ie15/7153/19260/00891306.pdf?tp=&isnumber=19260&arnumber=8913063&punumber=7153.

Chung, S. et al.: "Low complexity algorithm for rate and power quantization in extended V-BLAST" VTC Fall 2001, IEEE 54th. Vehicular Technology Conference Proceedings. Atlantic City, NJ, Oct. 7-11, 2001, vol. 1 of 4, pp. 910-914, Conf. 54.

El Gamal, H. et al.: "Universal Space-Time Coding," IEEE Transactions on Information Theory, vol. 49, Issue 5, pp. 1097-1119, XP011074756, ISSN: 0018-9448, May 2003.

"European Search Report—EP10011743, Search Authority—Munich Patent Office, Dec. 20, 2010".

European Search Report—EP10012081, Search Authority—Munich Patent Office, Dec. 17, 2010.

European Search Report—EP10012082, Search Authority—Munich Patent Office, Dec. 20, 2010.

European Search Report—EP10012083, Search Authority—Munich Patent Office, Dec. 30, 2010.

Groe, J. et al.: "CDMA Mobile Radio Design," Sep. 26, 2001, Artech House, Inc. Norwood, MA, pp. 257-259.

Guo, K. et al.: "Providing end-to-end QoS for multimedia applications in 3G wireless networks," Proceedings vol. 5242, SPIE ITCom 2003 Conf. Internet Multimedia Management Systems IV, Nov. 26, 2003, pp. 1-14, DOI: 10.1117/12.514061.

Hochwald, B. et al., "Achieving near-capacity on a multiple-antenna channel," IEEE Transactions on Communications, IEEE Service Center, Piscataway, New Jersey, vol. 51, No. 3, pp. 389-399 (2003).

Kiessling, M. et al., "Short-term and long-term diagonalization of correlated MIMO channels with adaptive modulation" IEEE International Symposium on Personal, Indoor and Mobile Radio Communications, vol. 2, Sep. 15, 2002, pp. 593-597.

Kousa, M. et al: "Adaptive Binary Coding for Diversity Communication Systems" IEEE International Conference on Personal Wireless Communications Proceedings, pp. 80-84, XP000992269, (1997).

Maniatis, I. et al., "Pilots for joint channel estimation in multi-user OFDM mobile radio systems." 2002 IEEE Seventh International Symposium on Spread Spectrum Techniques and Applications, Prague, Czech Republic, Sep. 2, 2002, pp. 44-48, XP010615562.

Nokia, "Uplink Considerations for UTRA LTE", 3GPP TSG RAN WG1#40bis, Beijing, CN, R1-050251, 3GPP, Apr. 4, 2005, pp. 1-9.

NTT DoCoMo, "Downlink Multiple Access Scheme for Evolved UTRA", 3GPP R1-050249, 3GPP, Apr. 4, 2005, pp. 1-8.

Prasad, N. et al.: "Analysis of Decision Feedback Detection for MIMO Rayleigh Fading Channels and Optimum Allocation of Transmitter Powers and QAM Constellations," pp. 1-10, 39th Annual Conference on Comm. Control and Comput., Monticello, IL Oct. 2001.

QUALCOMM Europe: "Description and link simulations for OFDMA based E-UTRA uplink" 3GPP Draft; R1-051100, 3rd Generation Partnership Project (3GPP), Mobile Competence Centre; Sophia-Antipolis Cedex, France, vol. RAN WG1, No. San Diego, USA; Oct. 4, 2005, pp. 1-10, XP050100715.

Sumii, Kenji et al.: "A Study on Computational Complexity Reduction of Iterative Decoding for Turbo-coded MIMO-SDM Using Sphere Decoding," Technical Report of IEICE. RCS, Nov. 9, 2010, vol. 104, No. 675, pp. 43-48.

Taiwanese Search Report—095139893—TIPO—Dec. 30, 2010.

Tomcik, T.: "QTDD Performance Report 2," IEEE C802.20-05/88. IEEE 802.20 Working Group on Mobile Broadband Wireless Access, <http://ieee802.org/20/>, pp. 1-56, XP002386798 (Nov. 15, 2005).

Translation of Office Action in Chinese Application 2006800295980 corresponding to U.S. Appl. No. 11/260,895, citing CN1346221 and CN1383631 dated Feb. 16, 2011.

Translation of Office Action in Japan application 2008-538193 corresponding to U.S. Appl. No. 11/261,065, citing JP11196109, JP10322304 and JP09008725 dated Mar. 8, 2011.

Translation of Office Action in Korean application 10-2007-7031029 corresponding to U.S. Appl. No. 11/260,931, citing US20030202491 and KR20040063057 dated Jan. 28, 2011.

Translation of Office Action in Canadian application 2625987 corresponding to U.S. Appl. No. 11/261,065, citing CA2557369 dated Apr. 12, 2011.

Translation of Office Action in Chinese application 200680040236.1 corresponding to U.S. Appl. No. 11/261,065, citing US20040048609 and CN1402916 dated Feb. 18, 2011.

Translation of Office Action in Chinese application 200680048265.2 corresponding to U.S. Appl. No. 11/260,931, citing US6904097, WO2004095851, CN1344451 dated Jan. 26, 2011.

Translation of Office Action in Chinese application 200680048832.4 corresponding to U.S. Appl. No. 11/261,158, citing CN1132474 dated Dec. 31, 2010.

Translation of Office Action in Japanese Application 2008-514880 corresponding to U.S. Appl. No. 11/445,377, citing JP2007519281 and JP2006505172 dated Nov. 9, 2010.

Translation of Office Action in Japanese application 2008-528103 corresponding to U.S. Appl. No. 11/260,924, citing JP2005502218, JP2004534456, JP2003348047, JP2003199173, JP2004529524, JP11508417, JP2001238269, JP2005130491 and JP2003500909 dated Feb. 8, 2011.

Translation of Office Action in Japanese Application 2008-529216 corresponding to U.S. Appl. No. 11/261,159, citing GB2348776, WO2004098222, WO2005065062 and WO2004102815.Dated Jan. 11, 2011.

Translation of Office Action in Japanese application 2008-538181 corresponding to U.S. Appl. No. 11/511,735, citing WO04064295, JP2002515203, JP8288927, JP7336323 and JP200157545 dated Jan. 25, 2011.

Voltz, P. J.,"Characterization of the optimum transmitter correlation matrix for MIMO with antenna subset selection", IEEE Transactions on Communications, vol. 51, No. 11, pp. 1779-1782, (Nov. 1, 2003).

Widdup, B. et al., "A highly-parallel VLSI architecture for a list sphere detector," IEEE International Conference, Paris, France, vol. 5, pp. 2720-2725 (2004).

Wiesel, A. et al.; "Efficient implementation of sphere demodulation" Signal Processing Advances in Wireless Communications, 2003. SPAWC 2003. 4th IEEE Workshop on Rome. Italy Jun. 15-18, 2003, Piscataway, NJ, USA, IEEE, US, Jun. 15, 2003, p. 36-40, XP010713463.

Yongmei Dai,; Sumei Sun; Zhongding Lei; Yuan Li.: "A List Sphere Decoder based turbo receiver for groupwise space time trellis coded (GSTTC) systems," 2004 IEEE 59th Vehicular Technology Conference, vol. 2, pp. 804-808, May 17, 2004, doi: 10.1109/VETECS.2004.1388940.

Anonymous: "3GPP TS 36.211 V8.0.0; Evolved Universal Terrestrial Radio Access (E-UTRA); Physical channels and modulation (Release 8)" 3rd Generation Partnership Project; Technical Specification Group Radio Access Network, [Online] 2007, XP002520076 Retrieved from the Internet: URL:http://www.Sgpp.org/ftp/Specs/html-i nf o/36211.htm> [retrieved on Sep. 27, 2007] Section 5.

Jim Tomcik, QFDD and QTDD: Technology Overview, IEEE 802.20 Working Group on Mobile Broadband Wireless Access, Oct. 28, 2005, pp. 48-50, URL, http://www.ieee802.org/20/contribs/c802.20-05-68.zip.

Miorandi D., et al., "Analysis of master-slave protocols for real-time industrial communications over IEEE 802.11 WLANs" Industrial Informatics, 2004. INDIN '04, 2nd IEEE International Conference on Berlin, Germany Jun. 24-26, 2004. Piscataway, NJ, USA IEEE, Jun. 24, 2004, pp. 143-148, XP010782619, ISBN 0789385136, Para 3, point B.

Nokia: "Compact signalling of multi-code allocation for HSDPA", version 2,3GPP R1-02-0018, Jan. 11, 2002.

Sethi M, et al., "Code Reuse DS-CDMA—A Space Time Approach", Proceedings of the 2002 IEEE International Conference on Acoustics, Speech, and Signal Processing (ICASSP), pp. 2297-2300, May 13-17, 2002.

Samsung: "Uplink Transmission and Multiplexing for EUTRA", 3GPP Draft; R1-050605 UL Multiplexing, Jun. 16, 2005, XP050111420.

* cited by examiner

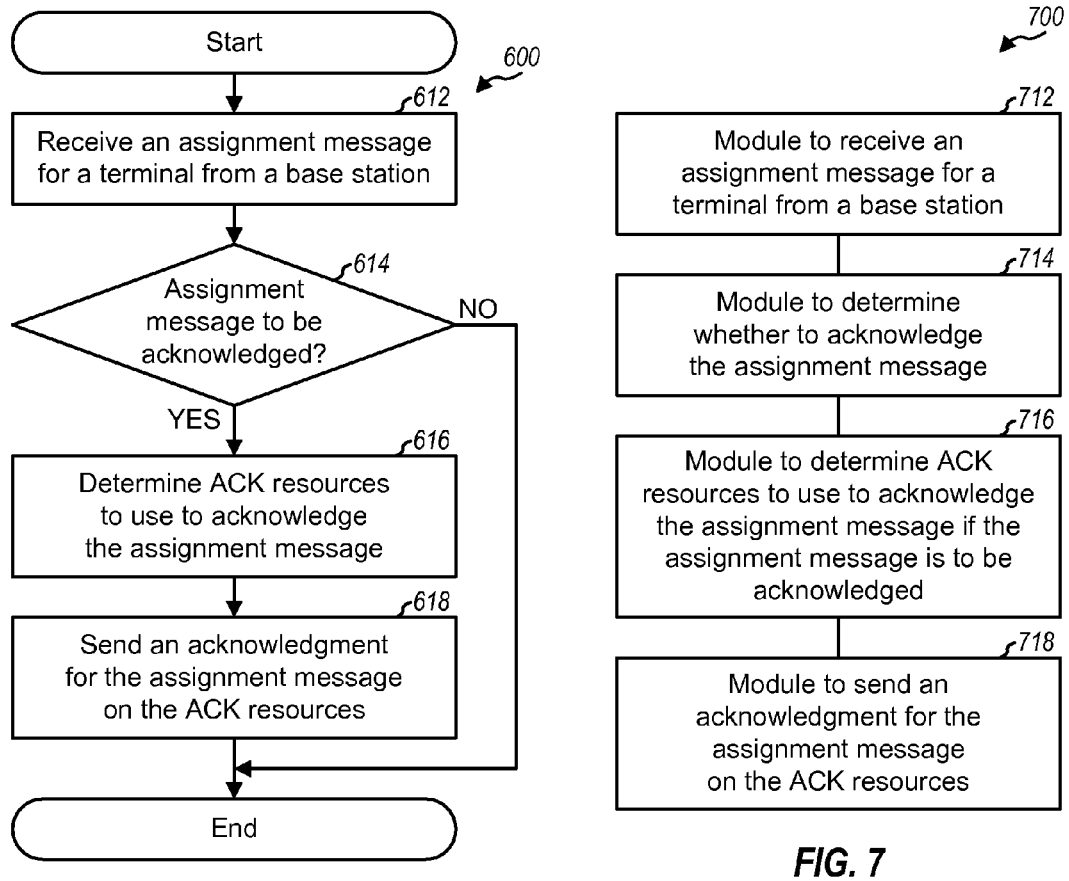
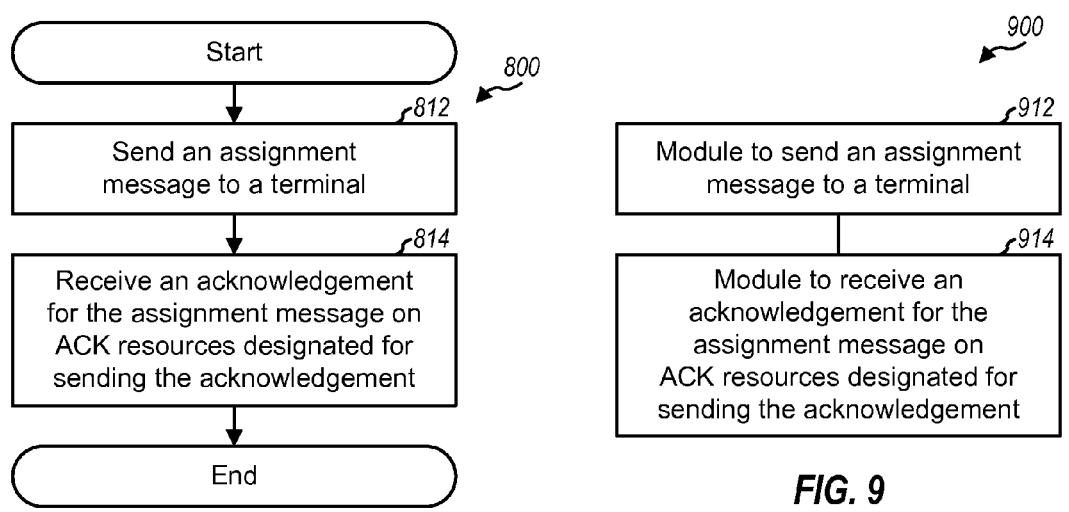

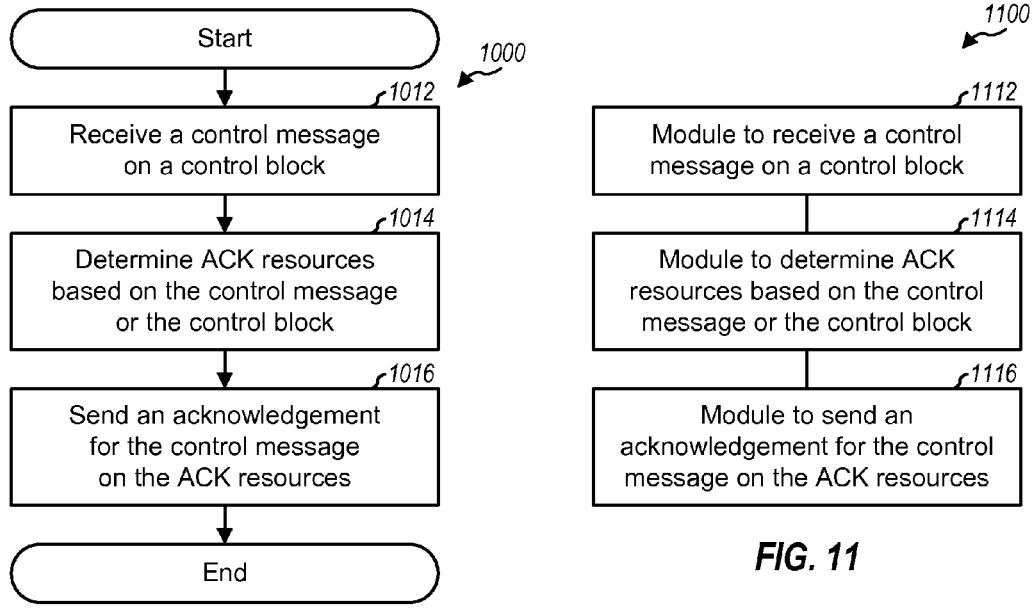
FIG. 10
FIG. 11
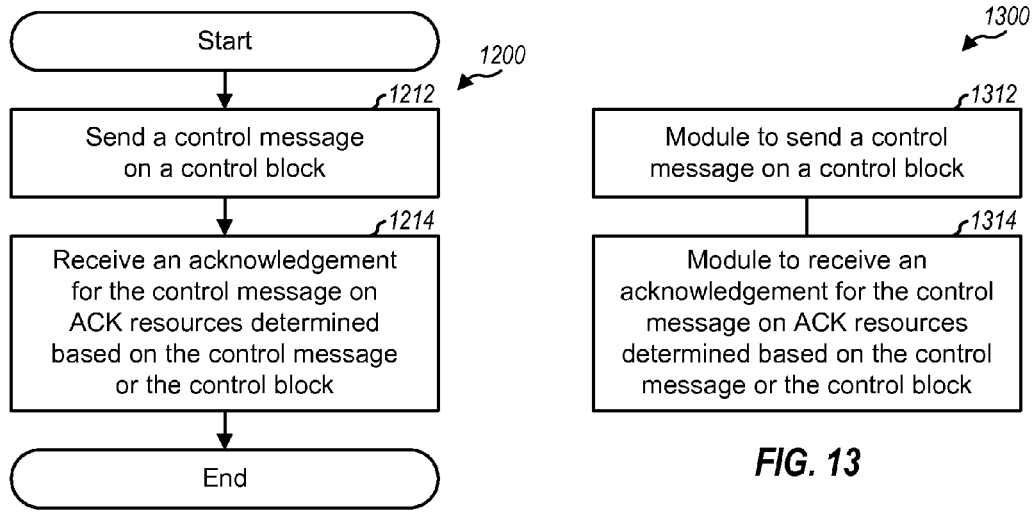
FIG. 12
FIG. 13

ACKNOWLEDGEMENT OF CONTROL MESSAGES IN A WIRELESS COMMUNICATION SYSTEM

The present application is a Continuation-In-Part of U.S. Ser. No. 11/260,931, filed Oct. 27, 2005, entitled: "PUNCTURING SIGNALING CHANNEL FOR A WIRELESS COMMUNICATION SYSTEM," and claims priority to provisional U.S. Application Ser. No. 60/868,464, filed Dec. 4, 2006, entitled "ASSIGNMENT ACKNOWLEDGEMENT FOR A WIRELESS COMMUNICATION SYSTEM," both assigned to the assignee hereof and incorporated herein by reference in their entirety.

BACKGROUND

I. Field

The present disclosure relates generally to communication, and more specifically to techniques for sending control messages.

II. Background

Wireless communication systems are widely deployed to provide various communication services such as voice, video, packet data, messaging, broadcast, etc. These wireless systems may be multiple-access systems capable of supporting communication for multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, Single-Carrier FDMA (SC-FDMA) systems, etc.

A multiple-access system typically employs a method of assigning system resources to individual users of the system. It is desirable to send assignments of resources as efficiently as possible in order to reduce the amount of overhead for sending the assignments. Furthermore, it is desirable to send the assignments in a reliable manner so that the assigned resources are properly used for data transmission. Reliability may be particularly important for persistent assignments that extend over time rather than have a deterministic expiration time.

There is therefore a need in the art for techniques to efficiently and reliably send assignment of resources.

SUMMARY

Techniques for efficiently and reliably sending control messages such as those for assignment of resources are described herein. In an aspect, assignment messages may be acknowledged based on either linked or dedicated acknowledgement (ACK) resources. In one design, a terminal may receive an assignment message from a base station and may determine whether to acknowledge the assignment message. For example, the assignment message may be acknowledged if it is received on a control block to be acknowledged. A control block may be logical resources that may be mapped to physical resources. If the assignment message is to be acknowledged, then the terminal may determine ACK resources to use to acknowledge the assignment message. The ACK resources may be linked to the control block on which the assignment message was received or linked to resources assigned by the assignment message. The ACK resources may also be dedicated ACK resources previously assigned to the terminal. The terminal may send the acknowledgement on the linked or dedicated ACK resources.

In another aspect, a control message may be acknowledged based on ACK resources determined based on the control message or a control block on which the control message is sent. In one design, a number of control blocks may be available for sending control messages. Certain control blocks may be linked to ACK resources, which may be used to send acknowledgements for control messages sent on these control blocks. The terminal may determine ACK resources based on the control message or the control block. The ACK resources may be linked to the control block or linked to resources assigned by the control message. The terminal may send an acknowledgement for the control message on the ACK resources.

Various aspects and features of the disclosure are described in further detail below.

BRIEF DESCRIPTION OF THE DRAWINGS

FIG. 6 shows a process for acknowledging assignment messages.
FIG. 7 shows an apparatus for acknowledging assignment messages.
FIG. 8 shows a process for sending assignment messages.
FIG. 9 shows an apparatus for sending assignment messages.
FIG. 10 shows a process for acknowledging control messages.
FIG. 11 shows an apparatus for acknowledging control messages.
FIG. 12 shows a process for sending control messages.
FIG. 13 shows an apparatus for sending control messages.

DETAILED DESCRIPTION

Figure 1:
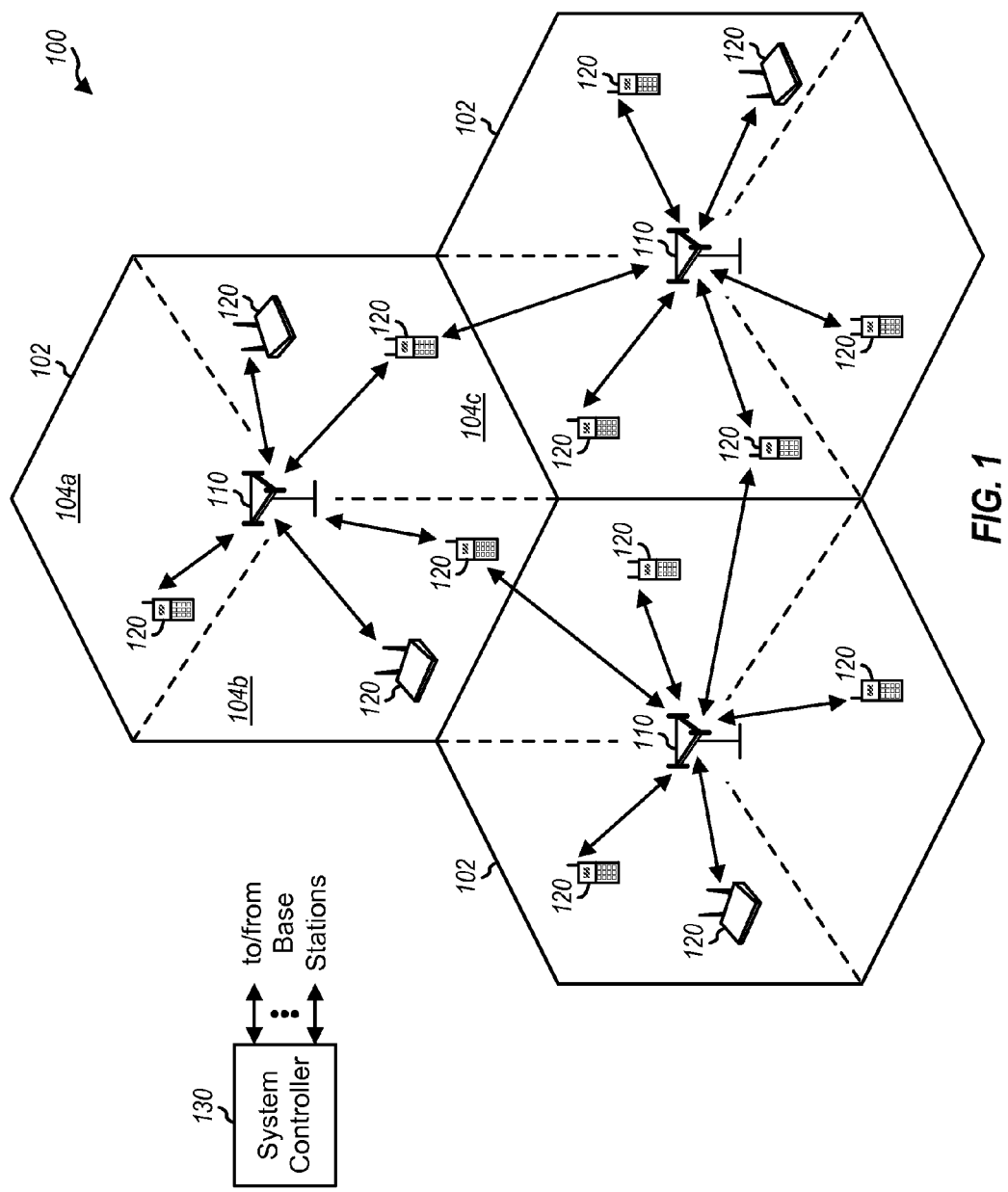
FIG. 1 shows a wireless communication system.

FIG. 1 shows a wireless communication system 100 with multiple base stations 110 and multiple terminals 120. A base station is a station that communicates with the terminals. A base station may also be referred to as an access point, a Node B, an evolved Node B, etc. Each base station 110 provides communication coverage for a particular geographic area 102. The term "cell" can refer to a base station and/or its coverage area depending on the context in which the term is used. To improve system capacity, a base station coverage area may be partitioned into multiple smaller areas, e.g., three smaller areas 104a, 104b, and 104c. Each smaller area may be served by a respective base station subsystem. The term "sector" can refer to the smallest coverage area of a base station and/or a base station subsystem serving this coverage area. The techniques described herein may be used for a system with sectorized cells as well as a system with un-sectorized cells. For simplicity, in the following description, the term "base station" is used generically for a station that serves a sector as well as a station that serves a cell.

Terminals 120 may be dispersed throughout the system, and each terminal may be stationary or mobile. A terminal may also be referred to as an access terminal, a mobile station, a user equipment, a subscriber unit, a station, etc. A terminal may be a cellular phone, a personal digital assistant (PDA), a wireless communication device, a wireless modem card, a handheld device, a laptop computer, a cordless phone, etc. A terminal may communicate with zero, one, or multiple base stations on the forward and reverse links at any given moment. The forward link (or downlink) refers to the communication link from the base stations to the terminals, and the reverse link (or uplink) refers to the communication link from the terminals to the base stations.

For a centralized architecture, a system controller 130 may couple to base stations 110 and provide coordination and control for these base stations. System controller 130 may be a single network entity or a collection of network entities. For a distributed architecture, the base stations may communicate with one another as needed.

The techniques described herein may be used for various wireless communication systems such as CDMA, TDMA, FDMA, OFDMA and SC-FDMA systems. The terms "system" and "network" are often used interchangeably. A CDMA system may implement a radio technology such as cdma2000, Universal Terrestrial Radio Access (UTRA), etc. An OFDMA system may implement a radio technology such as Ultra Mobile Broadband (UMB), Evolved UTRA (E-UTRA), IEEE 802.16, IEEE 802.20, Flash-OFDM®, etc. UTRA and E-UTRA are described in documents from an organization named "3rd Generation Partnership Project" (3GPP). cdma2000 and UMB are described in documents from an organization named "3rd Generation Partnership Project 2" (3GPP2). These various radio technologies and standards are known in the art. For clarity, certain aspects of the techniques are described below for UMB, and UMB terminology is used in much of the description below. UMB is described in 3GPP2 C.S0084-001, entitled "Physical Layer for Ultra Mobile Broadband (UMB) Air Interface Specification," and 3GPP2 C.S0084-002, entitled "Medium Access Control Layer For Ultra Mobile Broadband (UMB) Air Interface Specification," both dated August 2007 and publicly available.

System 100 may use various channels for transmission of traffic data and control information on the forward and reverse links. Table 1 lists some channels in UMB and provides a short for each channel. UMB also support various other channels on the forward and reverse links, which are not given in Table 1 for simplicity.

TABLE 1

| Symbol | Channel | Description |
| --- | --- | --- |
| F-SCCH | Forward Shared Control Channel | Carry access grants, assignment messages, and other messages related to resource management and/or other functions. |
| F-DCH | Forward Data Channel | Carry traffic data on the forward link. |
| R-ACKCH | Reverse Acknowledgement Channel | Carry acknowledgements for data sent on the F-DCH and possibly messages sent on the F-SCCH. |

A base station may send control messages to terminals for various purposes. For example, the base station may send control messages containing assignments of resources for the forward and/or reverse links, control information for data transmission on the forward and/or reverse links, etc. It is desirable to send the control messages as efficiently and reliably as possible.

In an aspect, control messages may be sent on control blocks that are linked to ACK resources that may be used to acknowledge these control messages. A control message may also be referred to as a message, a packet, signaling, etc. A control block may be logical resources used to send a control message and may also be referred to as a control channel block, an F-SCCH block, etc. Control messages may be processed (e.g., encoded, interleaved, and modulated) and sent on the control blocks. The control blocks may be mapped to physical resources, which may be given by time, frequency, code, etc. The ACK resources linked to the control blocks may correspond to certain physical resources reserved for sending acknowledgements for the control messages sent on the control blocks.

Figure 2A:
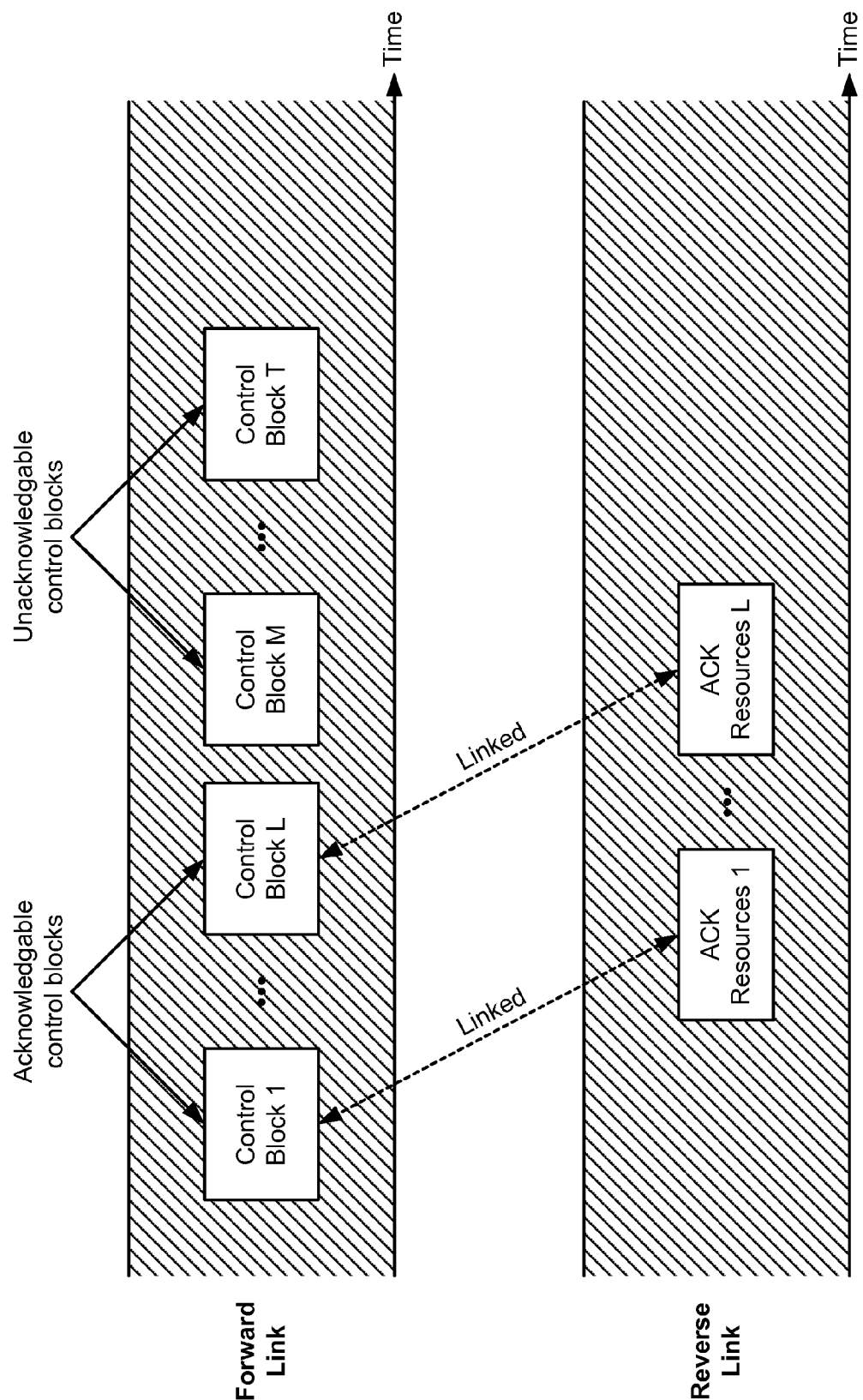
FIGS. 2A to 2C show linked and dedicated ACK resources.

FIG. 2A shows a design of sending acknowledgements for control messages using linked ACK resources. In this design, multiple (T) control messages may be processed and sent on T control blocks on the forward link. T may be selected based on various factors such as the expected number of control messages to send, the amount of resources to reserve for the control blocks, etc. All or a subset of the T control blocks may be linked to ACK resources. In the design shown in FIG. 2A, the first L control blocks 1 through L are linked to ACK resources 1 through L, respectively, and the remaining T−L control blocks are not linked to ACK resources, where in general $L \leq T$. For a control message sent on control block l, where $l \in \{1, \ldots, L\}$, an acknowledgement may be sent for the message on ACK resources l, which are linked to control block l. Control messages sent on the first L control blocks are acknowledgeable via their linked ACK resources. Messages sent on the remaining T−L control blocks are not acknowledgeable via linked ACK resources.

In one design, the T available control blocks may be partitioned into common control blocks and shared/multicast control blocks. The common control blocks may be monitored by all terminals. The shared control blocks may be further divided into groups, and multiple terminals may be assigned to each group. Each terminal may be assigned a specific group of control blocks and may then monitor the shared control blocks in that group as well as the common control blocks. This design may reduce the number of control blocks that each terminal monitors while improving utilization of the available control blocks via statistical multiplexing gains. In one design, the common control blocks may be linked to ACK resources whereas the shared control blocks are not linked to ACK resources. In another design, only a subset of the common control blocks may be linked to ACK resources. These designs allow the linked ACK resources to be shared by all terminals since the common control blocks are monitored by all terminals. In general, any number of control blocks and any of the available control blocks may be linked to ACK resources. The identities of the control blocks that are linked to ACK resources may be conveyed to the terminals via broadcast information and/or by other means.

In general, a control block may be used to send a unicast message to a specific terminal, a multicast message to a group of terminals, or a broadcast message to all terminals. The first L control blocks may be used to send messages deemed to be important and for which acknowledgements are desired. The remaining control blocks may be used to send messages for which acknowledgements may be forego. L may be selected based on various factors such as the expected number of messages for which acknowledgements are desired, the amount of ACK resources to reserve, etc. Various types of messages such as assignment messages, access grants, and messages related to resource management and/or other functions may be sent on the control blocks.

Table 2 lists some assignment messages that may be sent on the control blocks and provides a short description for each assignment message. In general, an assignment message may be for (i) assignment of forward link resources and/or reverse link resources, (ii) new assignment of resources, incremental/supplemental assignment of additional resources, or decremental assignment (de-assignment) of resources previously assigned, etc. In one design, an assignment message may include a supplemental bit that may be set to '0' to indicate that the message is for a new assignment or to '1' to indicate that the message is for an incremental or decremental assignment. A terminal can determine that an assignment message is for an incremental assignment if the resources assigned by the message are more than the resources currently assigned to the terminal. The terminal can determine that the assignment message is for a decremental assignment if the resources assigned by the message are less than the currently assigned resources.

TABLE 2

| Message Type | Description |
| --- | --- |
| Access Grant | Sent in response to an access sequence from a terminal and carry a MACID for the terminal. |
| Forward link assignment | Inform a terminal of modifications of forward link resources, e.g., for assignment of base nodes, subzones, packet format, precoding scheme, rank, etc. |
| Reverse link assignment | Inform a terminal of modifications of reverse link resources, e.g., for assignment of hop ports, packet format, etc. |

Figure 2B:
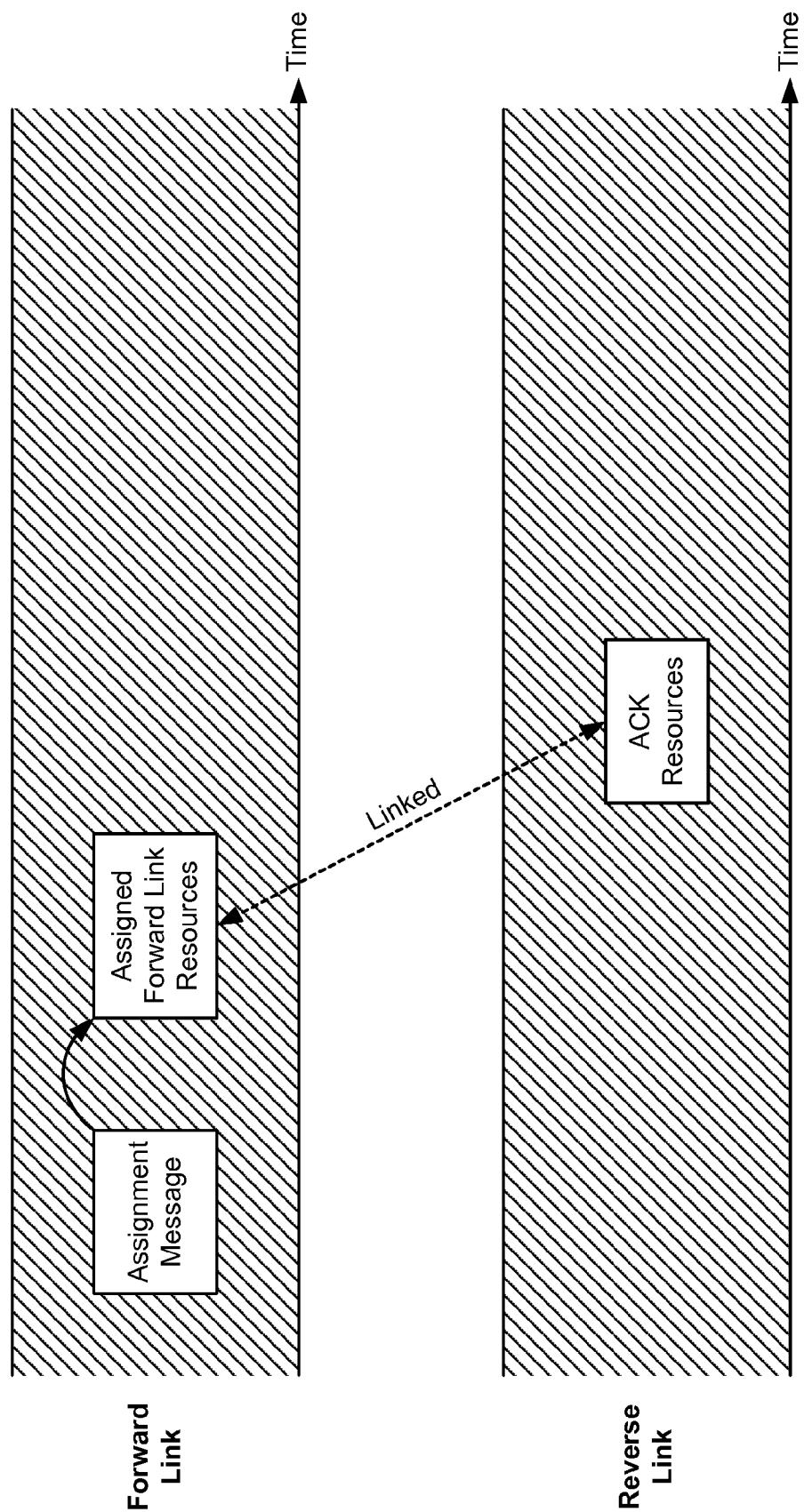

FIG. 2B shows a design of sending acknowledgements for assignment messages using ACK resources linked to the assigned resources. In this design, an assignment message for a terminal may be sent on a control block. The assignment message may convey forward link resources assigned to the terminal. The assigned forward link resources may be linked to ACK resources. The terminal may receive the assignment message, determine the assigned forward link resources, and send an acknowledgement for the assignment message on the ACK resources linked to the assigned forward link resources. The design shown in FIG. 2B may be used for any type of assignment message, e.g., for all or a subset of the assignment messages shown in Table 2.

Figure 2C:
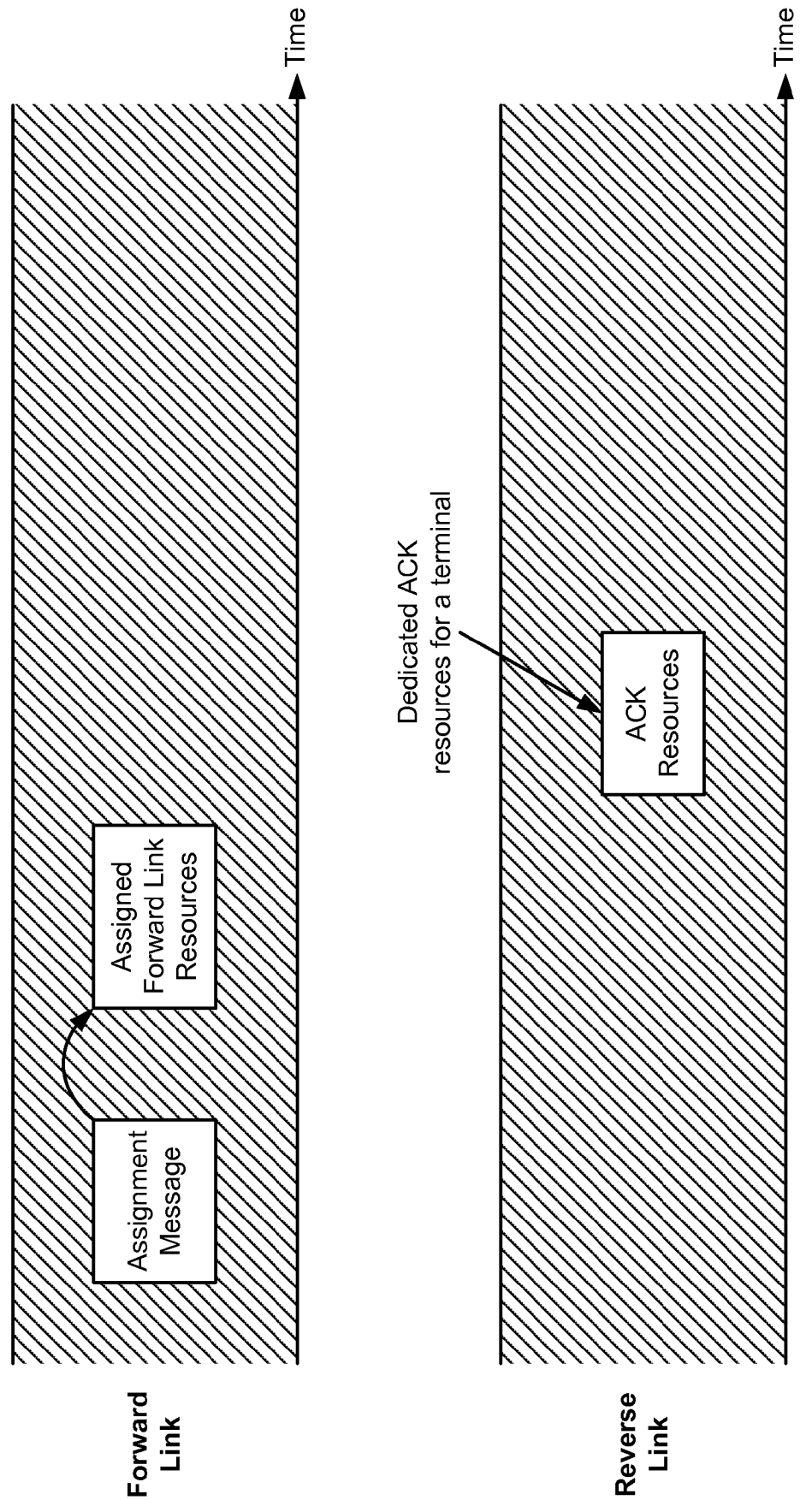

FIG. 2C shows a design of sending acknowledgements for assignment messages using dedicated ACK resources. In this design, an assignment message for a terminal may be sent on a control block. The assignment message may convey forward link resources assigned to the terminal. The terminal may receive the assignment message, determine the assigned forward link resources, and send an acknowledgement for the assignment message on ACK resources previously assigned to the terminal. For example, the terminal may be assigned certain ACK resources for acknowledging traffic data sent on the forward link and may use the assigned ACK resources to send the acknowledgement for the assignment message. The design shown in FIG. 2C may be used for any type of assignment message, e.g., for all or a subset of the assignment messages shown in Table 2.

FIGS. 2A through 2C show three designs of sending acknowledgements for assignment messages. It may be desirable to acknowledge assignment messages in order to increase assignment reliability, improve scheduling, reduce lost or not decoded packets, and/or obtain other benefits. Furthermore, by acknowledging assignment messages, the number of assignments to send may be reduced, and the resources and/or power budget available for other transmissions on the forward link may be increased.

The designs in FIGS. 2A through 2C may allow for efficient allocation and use of ACK resources for acknowledging assignment messages sent by base stations. The ACK resources may be linked to the control blocks used to send assignment messages (e.g., as shown in FIG. 2A) or linked to the assigned forward link resources (e.g., as shown in FIG. 2B). The ACK resources may also be dedicated ACK resources for a terminal (e.g., as shown in FIG. 2C).

A terminal may use its dedicated ACK resources to send acknowledgements for forward link data (or data ACKs), acknowledgements for assignment messages (or assignment ACKs), and/or acknowledgements for other messages or transmissions sent to the terminal. The use of dedicated ACK resources for data ACKs and/or assignment ACKs may be controlled by various factors such as the amount of dedicated ACK resources for the terminal, the type of assignment message received, whether data is received on the forward link data, etc. For example, if both forward link data and an assignment message are received, then acknowledgement may be sent only for the forward link data, or only for the assignment message, or both the forward link data and the assignment message.

The system may utilize orthogonal frequency division multiplexing (OFDM), single-carrier frequency division multiplexing (SC-FDM), and/or some other multiplexing scheme for each of the forward and reverse links. OFDM and SC-FDM partition the overall system bandwidth into multiple (K) orthogonal subcarriers, which are also referred to as tones, bins, etc. Each subcarrier may be modulated with data. In general, modulation symbols are sent in the frequency domain with OFDM and in the time domain with SC-FDM.

In one design, the time frequency resources on each link may be partitioned into tiles. Each tile may be a time frequency block of a predetermined dimension. On the forward link, certain tiles may be used for control blocks, and control messages may be processed and sent on these tiles. On the reverse link, ACK resources may occupy all or a portion of certain tiles, and acknowledgements may be sent on the ACK portion of these tiles.

Control messages (e.g., assignment messages) may be sent in various manners. In one design, control messages may be processed as individual packets. A control message may be appended with a cyclic redundancy check (CRC), encoded, interleaved, repeated as necessary, and mapped to modulation symbols. The modulation symbols may be mapped to a control block, which may then be mapped to one or more tiles. The processing for control messages is described in detail in the aforementioned 3GPP2 C.S0084 documents. The control messages may also be processed and sent in other manners.

Acknowledgements for control messages (e.g., assignment messages) may also be sent in various manners. For the designs shown in FIGS. 2A and 2B, the linked ACK resources may correspond to time frequency resources or symbols that are not used for acknowledging traffic data by the terminals. The linked ACK resources may be dynamically allocated and conveyed, e.g., by broadcast messages sent on the forward link, by system parameters, by signaling exchanged during call setup, etc. For the design shown in FIG. 2C, the dedicated ACK resources may be assigned to a terminal or may be associated with forward link resources assigned to the terminal.

In one design, the R-ACKCH includes all ACK resources available on the reverse link. Some of the available ACK resources may be used as linked ACK resources for the L control blocks, and the remaining ACK resources may be assigned to terminals.

Figure 3:
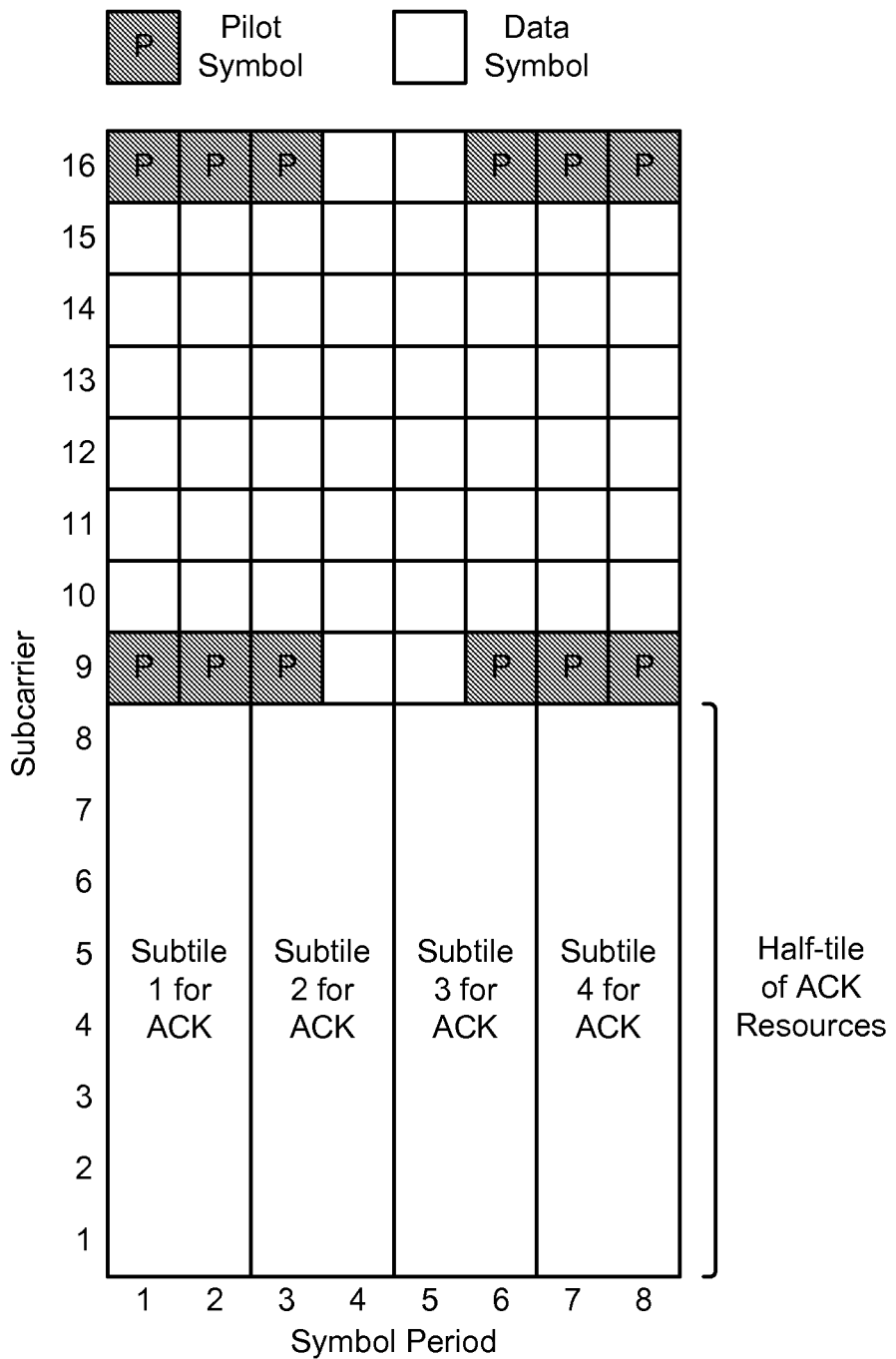
FIG. 3 shows a design of ACK resources.

FIG. 3 shows a design of ACK resources. In one design, a tile may cover 16 subcarriers in 8 symbol periods and may include 128 transmission units. A transmission unit may be one subcarrier in one symbol period and may be used to send one symbol, which may be a real or complex value. Pilot symbols may be sent on some of the transmission units in the tile, and other symbols may be sent on the remaining transmission units in the tile. As used herein, a data symbol is a symbol for traffic data, a signaling symbol is a symbol for signaling or control information, a pilot symbol is a symbol for pilot, and pilot is data that is known a priori by both the base station and the terminals.

The ACK resources for the R-ACKCH may be taken from specific tiles on the reverse link. In general, all or a portion of a tile may be used for ACK resources. In the design shown in FIG. 3, a half-tile may be used for ACK resources and may be partitioned into four subtiles. A half-tile may also be referred to as an ACK segment, and a subtile may also be referred to as an ACK cluster. The half-tile used for ACK resources may occupy the lower half of a tile and may cover 8 subcarriers in 8 symbol periods. Each subtile may cover 8 subcarriers in 2 consecutive symbol periods and may include 16 transmission units. The ACK resources may also be defined in other manners.

Figure 4:
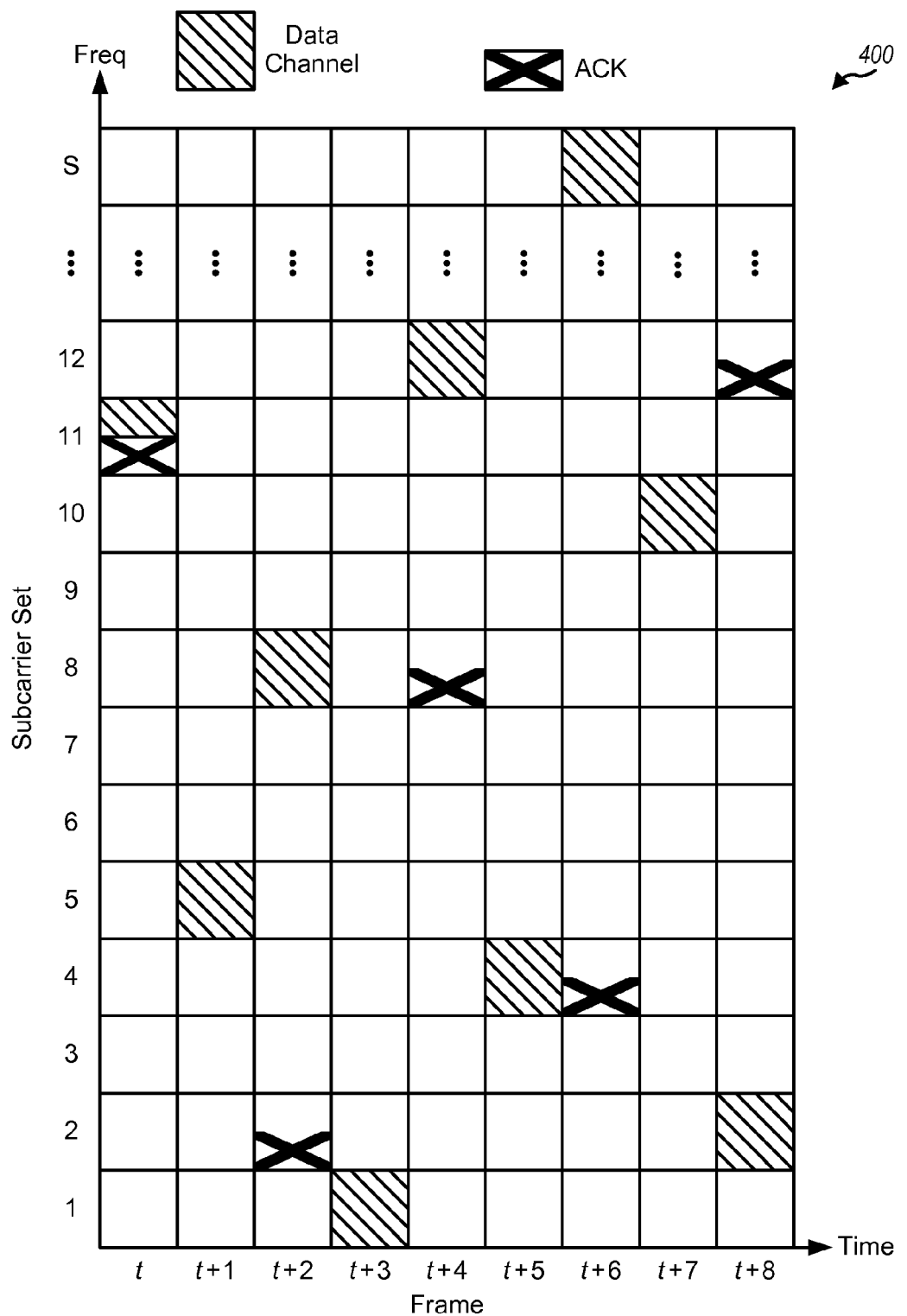
FIG. 4 shows a design of an ACK channel.

FIG. 4 shows a design of the R-ACKCH. The timeline for the reverse link may be partitioned into frames, and each frame may span a predetermined time duration, e.g., 8 symbol periods. The available subcarriers may be arranged into S non-overlapping sets. S tiles may be defined in each frame with the S subcarrier sets. The R-ACKCH may be mapped to one or more ACK tiles in each ACK frame. An ACK tile is a tile to which the R-ACKCH is mapped, and an ACK frame is a frame in which the R-ACKCH is sent. The R-ACKCH may puncture a portion of each ACK tile.

The number of ACK tiles and the number of ACK frames for the R-ACKCH may be dependent on various factors such as the system bandwidth, the number of data channels, the amount of forward link data to acknowledge, the expected number of control messages to be acknowledged, etc. In one design, the number of ACK tiles is dependent on the system bandwidth. For example, each ACK frame may include four ACK tiles for a system bandwidth of 5 MHz or lower, eight ACK tiles for a system bandwidth of 10 MHz, 16 ACK tiles for a system bandwidth of 20 MHz, etc. Fewer or more ACK tiles may also be used for the R-ACKCH in each ACK frame.

In one design, multiple (Q) ACK indices are defined for the R-ACKCH. Each ACK index may be associated with certain ACK resources that may be used to send acknowledgement. Forward link resources assigned to the terminals may be associated with ACK indices, as described below. Acknowledgeable control blocks may also be associated with ACK indices. In general, the forward link resources assigned to the terminals and the acknowledgeable control blocks may be mapped to ACK resources based on any known mapping.

The ACK resources for the R-ACKCH may occupy certain tiles on the reverse link, and these ACK tiles may be determined based on a predetermined mapping. In general, the ACK tiles may vary across time in a pseudo-random manner or a deterministic manner. The R-ACKCH may be mapped to different subcarrier sets to achieve frequency and interference diversity. The R-ACKCH may also be pseudo-random with respect to data channels on the reverse link and may equally puncture these data channels. This may be achieved by hopping the R-ACKCH, hopping the data channels, or hopping both the R-ACKCH and the data channels. A frequency hopping pattern may indicate specific tile(s) to use for the R-ACKCH in each ACK frame. The frequency hopping pattern may be sent to the terminals or may be known a priori by the terminals. In any case, the terminals have knowledge of the reverse link resources used for the R-ACKCH.

Multiple terminals may send acknowledgements using code division multiplexing (CDM), time division multiplexing (TDM), frequency division multiplexing (FDM), some other multiplexing scheme, or a combination thereof. Multiple terminals may send their acknowledgements in the same subtile using any multiplexing scheme.

In one design, acknowledgements are sent using CDM. In this design, acknowledgements from different terminals may be spread with different spreading codes, and the spread acknowledgements from these terminals may be orthogonal to one another in the code domain. The spreading codes may be Walsh codes, orthogonal codes formed with columns of a Fourier matrix, etc. A 1-bit acknowledgement from a terminal may be spread with an N-chip spreading code by replicating the acknowledgement bit N times and multiplying the N replicated bits with the N chips of the spreading code to obtain N spread chips for the acknowledgement. In one design, a 1-bit acknowledgement may be spread with a 16-chip spreading code to obtain 16 spread chips. The 16 spread chips may be mapped to 16 transmission units in one subtile. In another design, the 16 spread chips may be transformed with a 16-point fast Fourier transform (FFT) to obtain 16 symbols, which may then be mapped to 16 transmission units in one subtile. In any case, up to 16 different terminals may send their acknowledgements in the same subtile using different spreading codes, and up to 64 different terminals may send their acknowledgements in the four subtiles of one half-tile.

In one design, a subset of the available spreading codes is used for sending acknowledgements, and the remaining spreading codes are used for interference estimation. For example, eight spreading codes may be used to send acknowledgements in each subtile, and the remaining eight spreading codes may be used for interference estimation.

In one design, an acknowledgement may be sent on different subtiles in different tiles to achieve time and frequency diversity. For example, the acknowledgement may be sent on subtile 1 in a first tile, on subtile 2 in a second tile, on subtile 3 in a third tile, and on subtile 4 in a fourth tile. The four tiles may be in the same frame covering 8 symbol periods. Sending the acknowledgement on four different tiles occupying different sets of subcarriers may improve frequency diversity. Sending the acknowledgement on four different subtiles may improve time diversity as well as link budget for a terminal located at the edge of coverage. The terminal may have an upper limit on transmit power and may be able to transmit the acknowledgement with more energy spread over a longer period of time, which may improve reception of the acknowledgement. In general, an acknowledgement may be sent on C subtiles in C different tiles to achieve C-th order diversity, where $C \geq 1$.

A base station may perform the complementary despreading to recover the acknowledgements sent by the terminals. To recover an acknowledgement sent by a terminal on C different subtiles, the base station may despread the received symbols for each of the C subtiles with the spreading code used by the terminal to obtain C despread symbols for the C subtiles. For each of the C subtiles, the base station may also despread the received symbols with each of the spreading codes not used for sending acknowledgements to obtain an interference estimate for that subtile. The base station may scale and combine the C despread symbols with the interference estimates for the C subtiles to obtain a detected acknowledgement for the terminal.

In the design described above, a half-tile is partitioned into four subtiles, and an acknowledgement is sent on a set of subtiles using CDM. A half-tile may also be partitioned in other manners. In another design, each subtile may cover two subcarriers and span all 8 symbol periods. In yet another design, each subtile may include different subcarriers in different symbol periods of the half-tile. In general, acknowledgements may be sent on subtiles using CDM, TDM, FDM, etc.

Multiple terminals may receive individual assignment messages from a base station and may send acknowledgements for these messages on ACK resources in a single half-tile. A group of terminals may also receive a group assignment message that may be applicable to all terminals in the group. These terminals may also send acknowledgements for this group assignment message on a single half-tile.

In one design, a channel tree may be used to assign resources to terminals. The channel tree may constrain assignments of resources to a subset of all possible permutations of the available resources. This may reduce the amount of overhead to send assignment messages.

Figure 5:
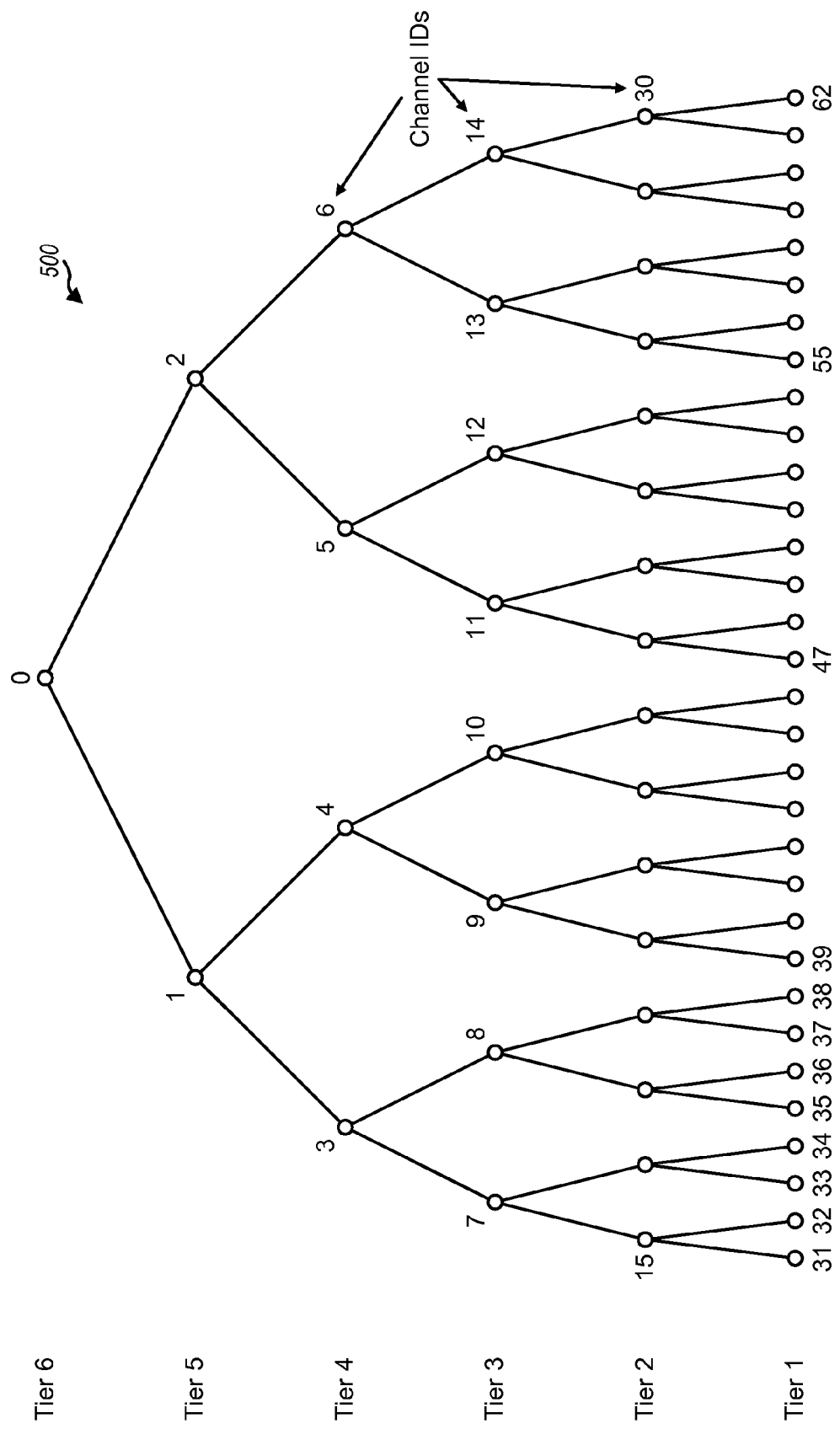
FIG. 5 shows a design of a binary channel tree.

FIG. 5 shows a design of a binary channel tree 500 for a case in which 32 subcarrier sets are available for use. A set of data channels may be defined with the 32 subcarrier sets. Each data channel may be assigned a unique channel ID and may be mapped to one or more subcarrier sets in each time interval. In one design, a data channel may be defined for each node in channel tree 500. The data channels may be sequentially numbered from top to bottom and from left to right for each tier, as shown in FIG. 5. The largest data channel corresponding to the topmost node is assigned a channel ID of 0 and is mapped to all 32 subcarrier sets. The 32 data channels in the lowest tier 1 have channel IDs of 31 through 62 and are called base channels or base nodes. Each base channel is mapped to one subcarrier set.

The tree structure shown in FIG. 5 places certain restrictions on the use of the data channels. For each data channel that is assigned, all data channels that are subsets (or descendants) of the assigned channel and all data channels for which the assigned channel is a subset are restricted. The restricted channels are not used concurrently with the assigned channel so that no two data channels use the same subcarrier set at the same time.

In one design, ACK resources may be assigned for each data channel that is assigned for use and may be conveyed to the terminal. The ACK resources may include pertinent resources (e.g., spreading code and subtiles) used to send an acknowledgement in each ACK frame. In this design, acknowledgements for each data channel may be sent on the ACK resources associated with that data channel.

In another design, ACK resources may be associated with each base channel/node in the channel tree. A larger data channel may use (i) the ACK resources for all base channels under the larger data channel, (ii) the ACK resources for one of the base channels, e.g., the base channel with the lowest channel ID, or (iii) the ACK resources for a subset of the base channels. For options (i) and (iii) above, an acknowledgement for the larger data channel may be sent using more ACK resources to improve reliability.

In yet another design, ACK resources may be assigned for each data packet to be acknowledged. If multiple data packets are sent in parallel, e.g., in a multiple-input multiple-output (MIMO) transmission, then a larger data channel with multiple base channels may be assigned for the transmission. The number of base channels may be equal to or greater than the number of data packets, and each data packet may be mapped to a different base channel. The acknowledgement for each data packet may then be sent using the ACK resources for the associated base channel.

In one design, an acknowledgement for an assignment message may be sent using ACK resources for a designed channel ID (e.g., the highest channel ID of an unused channel) if the acknowledgement is sent as part of a data transmission on the reverse link. For example, if the assignment message assigns channel ID 15 (which includes channel IDs 31 and 32) to a terminal, then an acknowledgement for the assignment message may be sent using the ACK resources for channel ID 32. This design may allow the base station to determine what is being acknowledged based on the channel ID on which the acknowledgement is received.

In one design, an acknowledgement for an assignment message may be sent if sufficient ACK resources associated with the assigned forward link resources are available to send the acknowledgement. For example, ACK resources may be associated with each base node in the channel tree. ACK resources may not be available to acknowledge control messages if a terminal is assigned only one base node and may be available if the terminal is assigned more than one base node.

A terminal may receive an assignment message and one or more data packets at or near the same time. The terminal may send acknowledgement only for the data packet(s) if no ACK resources are available to acknowledge the assignment message. This may be the case, e.g., if there is no unused channel, if the number of data packets to be acknowledged is equal to the number of available ACK resources for the terminal, etc. If the data packet(s) are sent on the forward link resources assigned by the assignment message and are decoded correctly, then the terminal may send acknowledgement only for the data packet(s). A base station may infer that the assignment message is received correctly by the terminal based on the acknowledgement received for the data packet(s). The terminal may also send acknowledgement for only the data packets if the terminal is link budget limited or power limited.

FIG. 6 shows a design of a process 600 for acknowledging assignment messages by a terminal. An assignment message for the terminal may be received from a base station (block 612). Whether to acknowledge the assignment message may be determined (block 614). The determination in block 614 may be based on various factors such as a control block on which the assignment message was received, the type of assignment message, whether at least one data packet is to be acknowledged, the amount of ACK resources available to the terminal for sending acknowledgements, etc. For example, acknowledgement may be sent if the assignment message is received on a control block in a group of control blocks for which acknowledgements are to be sent. As another example, acknowledgement may be sent if the assignment message is of certain types (e.g., new assignment) but not of other types (e.g., incremental or decremental). As yet another example, acknowledgement may be sent if sufficient ACK resources are available, which may be dependent on the amount of resources assigned by the assignment message.

If the assignment message is to be acknowledged ('Yes' for block 614), then ACK resources to use to acknowledge the assignment message may be determined (block 616). In one design, the ACK resources are linked to the control block on which the assignment message was received, e.g., as shown in FIG. 2A. In another design, the ACK resources are linked to resources assigned by the assignment message, e.g., as shown in FIG. 2B. In yet another design, the ACK resources are assigned to the terminal, e.g., as shown in FIG. 2C. In any case, an acknowledgment for the assignment message may be sent on the ACK resources (block 618). The acknowledgement may be sent across time and/or frequency to achieve diversity.

FIG. 7 shows a design of an apparatus 700 for acknowledging assignment messages. Apparatus 700 includes means for receiving an assignment message for a terminal from a base station (module 712), means for determining whether to acknowledge the assignment message (module 714), means for determining ACK resources to use to acknowledge the assignment message if the assignment message is to be acknowledged (module 716), and means for sending an acknowledgment for the assignment message on the ACK resources (module 718).

FIG. 8 shows a design of a process 800 for sending assignment messages by a base station. An assignment message may be sent to a terminal (block 812). An acknowledgement for the assignment message may be received on ACK resources designated for sending the acknowledgement (block 814). The ACK resources may be linked to a control block used to send the assignment message, linked to resources assigned by the assignment message, or assigned to the terminal.

FIG. 9 shows a design of an apparatus 900 for sending assignment messages. Apparatus 900 includes means for sending an assignment message to a terminal (module 912), and means for receiving an acknowledgement for the assignment message on ACK resources designated for sending the acknowledgement (module 914).

FIG. 10 shows a design of a process 1000 for acknowledging control messages by a terminal. A control message may be received on a control block (block 1012). ACK resources may be determined based on the control message or the control block (block 1014). In one design, the ACK resources may be linked to the control block. In another design, the control message may be an assignment message that assigns resources to the terminal, and the ACK resources may be linked to the assigned resources. The ACK resources may also be determined in other manners. An acknowledgement for the control message may be sent on the ACK resources (block 1016).

Acknowledgements may be sent based on various criteria. In one design, acknowledgements may be sent for certain control blocks, e.g., control blocks linked to ACK resources. For example, the terminal may monitor at least one first (e.g., common) control block used by a base station to send control messages to be acknowledged. The terminal may send acknowledgements for control messages received on the at least one first control block. The terminal may monitor at least one second (e.g., shared) control block used by the base station to send control messages not to be acknowledged. The terminal may send no acknowledgements for control messages received on the at least one second control block. In another design, the terminal may send acknowledgements for (i) certain type of control messages, e.g., for assignment messages but not for access grant messages, or (ii) certain types of assignment messages. The terminal may also send acknowledgements based on other criteria.

FIG. 11 shows a design of an apparatus 1100 for acknowledging control messages. Apparatus 1100 includes means for receiving a control message on a control block (module 1112), means for determining ACK resources based on the control message or the control block (module 1114), and means for sending an acknowledgement for the control message on the ACK resources (module 1116).

FIG. 12 shows a design of a process 1200 for sending control messages by a base station. A control message may be sent on a control block (block 1212). An acknowledgement for the control message may be received on ACK resources determined based on the control message or the control block (block 1214).

FIG. 13 shows a design of an apparatus 1300 for sending control messages. Apparatus 1300 includes means for sending a control message on a control block (module 1312), and means for receiving an acknowledgement for the control message on ACK resources determined based on the control message or the control block (module 1314).

The modules in FIGS. 7, 9, 11 and 13 may comprise processors, electronics devices, hardware devices, electronics components, logical circuits, memories, etc., or any combination thereof.

Figure 14:
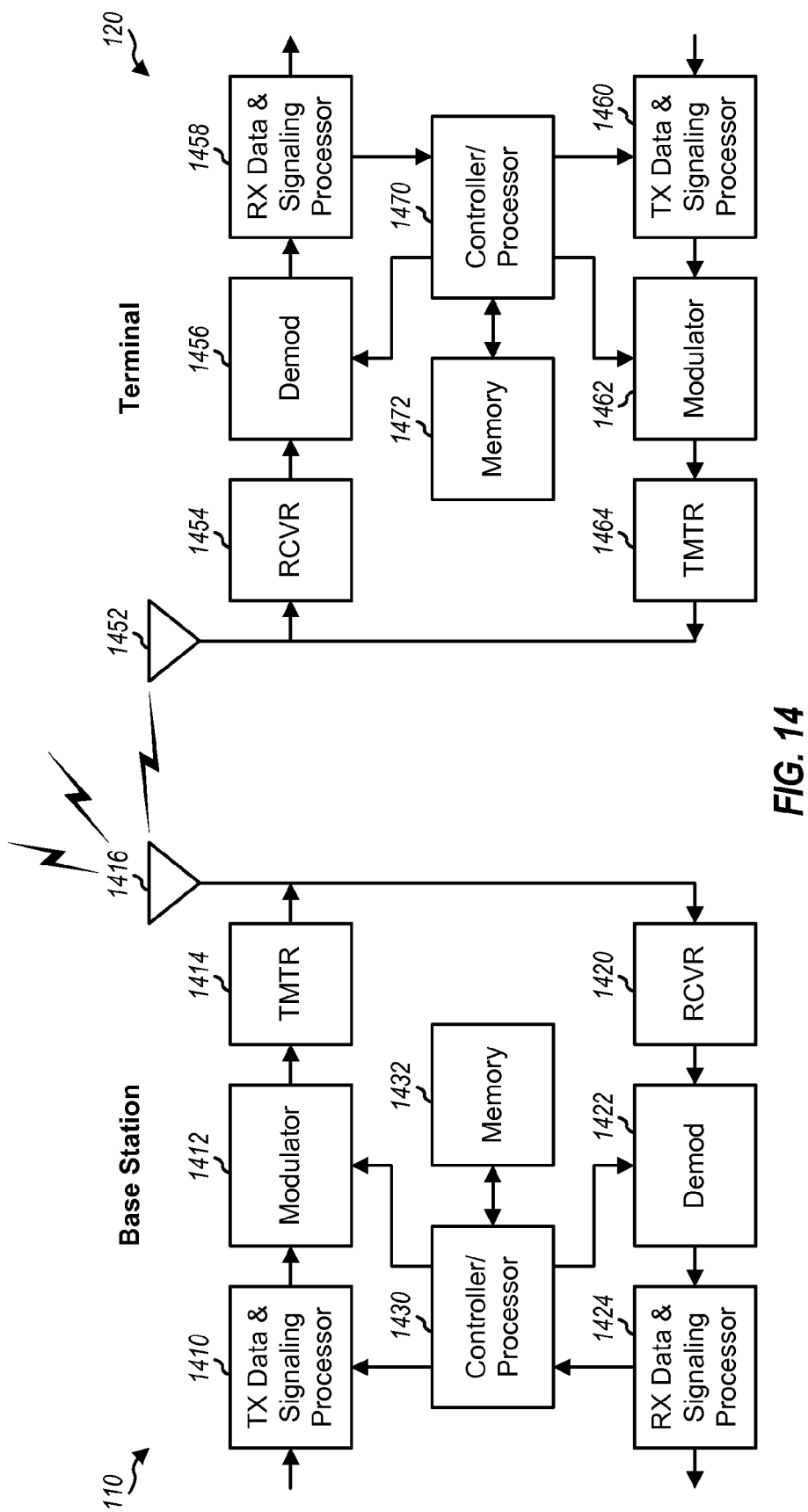
FIG. 14 shows a block diagram of a base station and a terminal.

FIG. 14 shows a block diagram of a design of a base station 110 and a terminal 120, which may be one of the base stations and one of the terminals in FIG. 1. In this design, base station 110 and terminal 120 are each equipped with a single antenna.

At base station 110, a transmit (TX) data and signaling processor 1410 may receive traffic data for one or more terminals, process (e.g., encode, interleave, and symbol map) the traffic data for each terminal based on one or more packet formats selected for that terminal, and provide data symbols. Processor 1410 may also process control messages (e.g., assignment messages) and provide signaling symbols. Processor 1410 may also generate pilot symbols. A modulator 1412 may perform modulation on the data symbols, signaling symbols, and pilot symbols (e.g., for OFDM, CDM, SC-FDM, etc.) and provide output chips. A transmitter (TMTR) 1414 may condition (e.g., convert to analog, filter, amplify, and upconvert) the output chips and generate a forward link signal, which may be transmitted via an antenna 1416.

At terminal 120, an antenna 1452 may receive the forward link signals from base station 110 and possibly other base stations and may provide a received signal to a receiver (RCVR) 1454. Receiver 1454 may condition and digitize the received signal and provide received samples. A demodulator (Demod) 1456 may perform demodulation on the received samples (e.g., for OFDM, CDM, SC-FDM, etc.) and provide received symbols. A receive (RX) data and signaling processor 1458 may process (e.g., symbol demap, deinterleave, and decode) the received symbols and provide decoded data and control messages for terminal 120.

A controller/processor 1470 may receive decoding results from processor 1458 and generate acknowledgements for data packets, control messages, etc. A TX data and signaling processor 1460 may process traffic data to send to base station 110 to obtain data symbols, process acknowledgements and/or other control information to obtain signaling symbols, and generate pilot symbols. A modulator 1462 may perform modulation on the data symbols, signaling symbols, and pilot symbols and provide output chips. A transmitter 1464 may condition the output chips and generate a reverse link signal, which may be transmitted via antenna 1452.

At base station 110, reverse link signals from terminal 120 and other terminals may be received by antenna 1416, conditioned and digitized by a receiver 1420, demodulated by a demodulator 1422, and processed by an RX data and signaling processor 1424 to recover the traffic data, acknowledgements, and/or other control information sent by terminal 120 and other terminals. A controller/processor 1430 may receive the acknowledgements and control the data transmission on the forward link to the terminals.

Controllers/processors 1430 and 1470 may direct the operation at base station 110 and terminal 120, respectively. Memories 1432 and 1472 may store program codes and data for base station 110 and terminal 120, respectively.

The concept of channels described herein may refer to information or transmission types that may be transmitted by a terminal or a base station. It does not require or utilize fixed or predetermined sets of subcarriers, time periods, or other resources dedicated to such transmissions. Furthermore, time frequency resources are exemplary resources that may be assigned and/or used for sending data and messages/signaling. The time frequency resources may also comprise frequency subcarriers, transmission symbols, and/or other resources in addition to time frequency resources.

The techniques described herein may be implemented by various means. For example, these techniques may be implemented in hardware, firmware, software, or a combination thereof. For a hardware implementation, the processing units at an entity (e.g., a terminal or a base station) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

For a firmware and/or software implementation, the techniques may be implemented with code (e.g., procedures, functions, modules, instructions, etc.) that performs the functions described herein. In general, any computer/processor-readable medium tangibly embodying firmware and/or software code may be used in implementing the techniques described herein. For example, the firmware and/or software code may be stored in a memory (e.g., memory 1432 or 1472 in FIG. 14) and executed by a processor (e.g., processor 1430 or 1470). The memory may be implemented within the processor or external to the processor. The firmware and/or software code may also be stored in a computer/processor-readable medium such as random access memory (RAM), read-only memory (ROM), non-volatile random access memory (NVRAM), programmable read-only memory (PROM), electrically erasable PROM (EEPROM), FLASH memory, floppy disk, compact disc (CD), digital versatile disc (DVD), magnetic or optical data storage device, etc. The code may be executable by one or more computers/processors and may cause the computer/processor(s) to perform certain aspects of the functionality described herein.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus for wireless communication, comprising:
at least one processor configured to receive an assignment message, on a control block associated with one type of a plurality of types of logical resources, for a terminal from a base station, to determine whether to acknowledge the assignment message based on the type of logical resources associated with the control block on which the assignment message was received, and if the assignment message is to be acknowledged, to determine acknowledgement (ACK) resources to use to acknowledge the assignment message; and
a memory coupled to the at least one processor.

2. The apparatus of claim 1, wherein the at least one processor is configured to send an acknowledgment for the assignment message on ACK resources linked to the logical resources associated with the control block on which the assignment message was received.

3. The apparatus of claim 1, wherein the at least one processor is configured to send an acknowledgment for the assignment message on ACK resources linked to resources assigned by the assignment message.

4. The apparatus of claim 1, wherein the at least one processor is configured to send an acknowledgment on ACK resources assigned to the terminal.

5. A method for wireless communication, comprising:
receiving an assignment message, on a control block associated with one type of a plurality of types of logical resources, for a terminal from a base station;
determining whether to acknowledge the assignment message based on the type of logical resources associated with the control block on which the assignment message was received; and
determining acknowledgement (ACK) resources to use to acknowledge the assignment message if the assignment message is to be acknowledged.

6. The method of claim 5, further comprising:
sending an acknowledgment for the assignment message on ACK resources linked to the logical resources associated with the control block on which the assignment message was received.

7. An apparatus for wireless communication, comprising:
means for receiving an assignment message, on a control block associated with one type of a plurality of types of logical resources, for a terminal from a base station;
means for determining whether to acknowledge the assignment message based on the type of logical resources associated with the control block on which the assignment message was received; and
means for determining acknowledgement (ACK) resources to use to acknowledge the assignment message if the assignment message is to be acknowledged.

8. The apparatus of claim 7, further comprising:
means for sending an acknowledgment for the assignment message on ACK resources linked to the logical resources associated with the control block on which the assignment message was received.

9. A computer program product, comprising:
a non-transitory computer-readable medium comprising:
code for causing at least one computer to receive an assignment message, on a control block associated with one type of a plurality of types of logical resources, for a terminal from a base station;
code for causing the at least one computer to determine whether to acknowledge the assignment message based on the type of logical resources associated with the control block on which the assignment message was received; and
code for causing the at least one computer to determine acknowledgement (ACK) resources to use to acknowledge the assignment message if the assignment message is to be acknowledged.

10. An apparatus for wireless communication, comprising:
at least one processor configured to send an assignment message to a terminal, wherein the at least one processor is configured to send the assignment message on a control block associated with one type of a plurality of types logical resources, and wherein the at least one processor is configured to receive an acknowledgement for the assignment message based on the type of logical resources associated with the control block; and
a memory coupled to the at least one processor.

11. The apparatus of claim 10, wherein the at least one processor is configured to receive the acknowledgment on ACK resources linked to logical resources associated with the control block.

12. The apparatus of claim 10, wherein the at least one processor is configured to receive the acknowledgment on ACK resources linked to resources assigned by the assignment message.

13. The apparatus of claim 10, wherein the at least one processor is configured to receive the acknowledgment on ACK resources assigned to the terminal.

14. An apparatus for wireless communication, comprising:
at least one processor configured to receive a control message on a control block associated with one type of a plurality of types of logical resources, and to determine acknowledgement (ACK) resources based on the type of logical resources associated with the control block; and
a memory coupled to the at least one processor.

15. The apparatus of claim 14, wherein the ACK resources are linked to the logical resources associated with the control block.

16. The apparatus of claim 14, wherein the at least one processor is configured to send the acknowledgement if the control block is associated with a set of logical resources for which acknowledgements are to be sent.

17. The apparatus of claim 14, wherein the at least one processor is configured to send the acknowledgement if the control message is an assignment message.

18. The apparatus of claim 14, wherein the at least one processor is configured to send the acknowledgement if the control message is of a type for which acknowledgement is to be sent.

19. The apparatus of claim 14, wherein the at least one processor is configured to monitor a first set of logical resources used by a base station to send control messages to be acknowledged, and to send an acknowledgement for the control message if the control block is associated with the first set of logical resources.

20. The apparatus of claim 19, wherein the at least one processor is configured to monitor a second set of logical resources used by the base station to send control messages not to be acknowledged, and to send no acknowledgement for the control message if the control block is associated with the second set of logical resources.

21. A method for wireless communication, comprising:
receiving a control message on a control block associated with one type of a plurality of types of logical resources,
determining acknowledgement (ACK) resources based on the type of logical resources associated with the control block; and
sending an acknowledgement for the control message on the ACK resources.

22. The method of claim 21, wherein the ACK resources are linked to logical resources associated with the control block.

23. The method of claim 21, wherein the sending the acknowledgement comprises sending the acknowledgement if the control block is associated with a set of logical resources for which acknowledgements are to be sent.

24. The method of claim 21, further comprising:
monitoring at least one first set of logical resources used by a base station to send control messages to be acknowledged; and
sending the acknowledgement for the control message if the control block is associated with the first set of logical resources.

25. The method of claim 24, further comprising:
monitoring at least one second set of logical resources used by the base station to send control messages not to be acknowledged, and
sending no acknowledgement for the control message if the control block is associated with the second set of logical resources.

26. An apparatus for wireless communication, comprising:
means for receiving a control message on a control block associated with one type of a plurality of types of logical resources,
means for determining acknowledgement (ACK) resources based on the type of logical resources associated with the control block; and
means for sending an acknowledgement for the control message on the ACK resources.

27. The apparatus of claim 26, wherein the ACK resources are linked to the control block.

28. The apparatus of claim 26, wherein the means for sending the acknowledgement comprises means for sending the acknowledgement if the control block is associated with a set of logical resources for which acknowledgements are to be sent.

29. The apparatus of claim 26, further comprising:
means for monitoring at least one first set of logical resources used by a base station to send control messages to be acknowledged; and
means for sending the acknowledgement for the control message if the control block is associated with the first set of logical resources.

30. The apparatus of claim 29, further comprising:
means for monitoring at least one second set of logical resources used by the base station to send control messages not to be acknowledged, and
means for sending no acknowledgement for the control message if the control block is associated with the second set of logical resources.

31. A computer program product, comprising:
a non-transitory computer-readable medium comprising:
code for causing at least one computer to receive a control message on a control block associated with one type of a plurality of types of logical resources;
code for causing the at least one computer to determine acknowledgement (ACK) resources based on the type of logical resources associated with the control block; and
code for causing the at least one computer send an acknowledgement for the control message on the ACK resources.

32. An apparatus for wireless communication, comprising:
at least one processor configured to send a control message on a control block associated with one type of a plurality of types of logical resources, and to receive an acknowledgement for the control message on acknowledgement (ACK) resources determined based on the type of logical resources associated with the control block; and
a memory coupled to the at least one processor.

33. The apparatus of claim 32, wherein the at least one processor is configured to send control messages on at least one first control block linked to ACK resources, and to receive acknowledgements for the control messages sent on the at least one first control blocks via the linked ACK resources.

34. The apparatus of claim 33, wherein the at least one processor is configured to send control messages on at least one second control block not linked to ACK resources, and to receive no acknowledgements for the control messages sent on the at least one second control blocks.

35. The apparatus of claim 1, wherein the at least one processor is configured to acknowledge the assignment message when the control block is associated with common logical resources and not to acknowledge the assignment message when the control block is associated with shared logical resources.

36. The method of claim 5, further comprising acknowledging the assignment message when the control block is associated with common logical resources and not acknowledging the assignment message when the control block is associated with shared logical resources.

37. The apparatus of claim 7, further comprising: means for acknowledging the assignment message when the control block is associated with common logical resources and not acknowledging the assignment message when the control block is associated with shared logical resources.

38. The computer program product of claim 9, wherein the non-transitory computer-readable medium further comprises code for causing the at least one computer to acknowledge the assignment message when the control block is associated with common logical resources and not to acknowledge the assignment message when the control block is associated with shared logical resources.

39. The apparatus of claim 10, wherein the at least one processor is configured to acknowledge the assignment message when the control block is associated with common logical resources and not to acknowledge the assignment message when the control block is associated with shared logical resources.

40. The apparatus of claim 14, wherein the at least one processor is configured to acknowledge the assignment message when the control block is associated with common logical resources and not to acknowledge the assignment message when the control block is associated with shared logical resources.

41. The method of claim 21, further comprising acknowledging the assignment message when the control block is associated with common logical resources and not acknowledging the assignment message when the control block is associated with shared logical resources.

42. The apparatus of claim 26, further comprising: means for acknowledging the assignment message when the control block is associated with common logical resources and not acknowledging the assignment message when the control block is associated with shared logical resources.

43. The computer program product of claim 31, wherein the non-transitory computer-readable medium further comprises code for causing the at least one computer to acknowledge the assignment message when the control block is associated with common logical resources and not to acknowledge the assignment message when the control block is associated with shared logical resources.

44. The apparatus of claim 32, wherein the at least one processor is configured to acknowledge the assignment message when the control block is associated with common logical resources and not to acknowledge the assignment message when the control block is associated with shared logical resources.

* * * * *